(12) United States Patent
Baptist et al.

(10) Patent No.: US 8,938,552 B2
(45) Date of Patent: Jan. 20, 2015

(54) RESOLVING A PROTOCOL ISSUE WITHIN A DISPERSED STORAGE NETWORK

(75) Inventors: Andrew Baptist, Chicago, IL (US); Wesley Leggette, Oak Park, IL (US); Jason K. Resch, Chicago, IL (US)

(73) Assignee: Cleversafe, Inc., Chicago, IL (US)

( * ) Notice: Subject to any disclaimer, the term of this patent is extended or adjusted under 35 U.S.C. 154(b) by 517 days.

(21) Appl. No.: 13/180,669

(22) Filed: Jul. 12, 2011

(65) Prior Publication Data

US 2012/0030371 A1    Feb. 2, 2012

Related U.S. Application Data

(63) Continuation of application No. 13/080,431, filed on Apr. 5, 2011.

(60) Provisional application No. 61/369,802, filed on Aug. 2, 2010.

(51) Int. Cl.
    *G06F 15/16*    (2006.01)
    *H04L 29/08*    (2006.01)
    *H04L 29/06*    (2006.01)
    *H04L 1/24*     (2006.01)

(52) U.S. Cl.
    CPC .............. *H04L 67/16* (2013.01); *H04L 63/08* (2013.01); *H04L 63/123* (2013.01); *H04L 1/24* (2013.01)
    USPC ................. 709/236; 714/42; 714/54; 714/769

(58) Field of Classification Search
    CPC ............ H04L 1/0083; H04L 29/06095; H04L 29/08549; H04L 67/1097; H04L 69/30; G06F 3/0601

USPC ............. 709/224, 232; 714/6.13, 42, 43, 769; 710/8, 15
See application file for complete search history.

(56) References Cited

U.S. PATENT DOCUMENTS

| | | |
|---|---|---|
| 4,092,732 A | 5/1978 | Ouchi |
| 5,454,101 A | 9/1995 | Mackay et al. |
| 5,485,474 A | 1/1996 | Rabin |
| 5,774,643 A | 6/1998 | Lubbers et al. |
| 5,802,364 A | 9/1998 | Senator et al. |
| 5,809,285 A | 9/1998 | Hilland |
| 5,890,156 A | 3/1999 | Rekieta et al. |
| 5,987,622 A | 11/1999 | Lo Verso et al. |

(Continued)

OTHER PUBLICATIONS

Shamir; How to Share a Secret; Communications of the ACM; vol. 22, No. 11; Nov. 1979; pp. 612-613.

(Continued)

*Primary Examiner* — Dustin Nguyen
(74) *Attorney, Agent, or Firm* — Garlick & Markison; Holly L. Rudnick

(57) ABSTRACT

A method begins by a processing module detecting a potential dispersed storage network (DSN) protocol issue that effects access of dispersed storage error encoded data within a DSN. The method continues with the processing module identifying a DSN entity based on the DSN protocol issue and generating a DSN protocol inquiry frame. The method continues with the processing module transmitting the DSN protocol inquiry frame to the DSN entity. The method continues with the processing module receiving a DSN protocol response frame from the DSN entity and resolving the DSN protocol issue based on the DSN protocol response frame.

18 Claims, 18 Drawing Sheets

(56) References Cited

U.S. PATENT DOCUMENTS

| | | | |
|---|---|---|---|
| 5,991,414 | A | 11/1999 | Garay et al. |
| 6,012,159 | A | 1/2000 | Fischer et al. |
| 6,058,454 | A | 5/2000 | Gerlach et al. |
| 6,128,277 | A | 10/2000 | Bruck et al. |
| 6,175,571 | B1 | 1/2001 | Haddock et al. |
| 6,192,472 | B1 | 2/2001 | Garay et al. |
| 6,256,688 | B1 | 7/2001 | Suetaka et al. |
| 6,272,658 | B1 | 8/2001 | Steele et al. |
| 6,301,604 | B1 | 10/2001 | Nojima |
| 6,356,949 | B1 | 3/2002 | Katsandres et al. |
| 6,366,995 | B1 | 4/2002 | Vilkov et al. |
| 6,374,336 | B1 | 4/2002 | Peters et al. |
| 6,415,373 | B1 | 7/2002 | Peters et al. |
| 6,418,539 | B1 | 7/2002 | Walker |
| 6,449,688 | B1 | 9/2002 | Peters et al. |
| 6,567,948 | B2 | 5/2003 | Steele et al. |
| 6,571,282 | B1 | 5/2003 | Bowman-Amuah |
| 6,609,223 | B1 | 8/2003 | Wolfgang |
| 6,718,361 | B1 | 4/2004 | Basani et al. |
| 6,760,808 | B2 | 7/2004 | Peters et al. |
| 6,785,768 | B2 | 8/2004 | Peters et al. |
| 6,785,783 | B2 | 8/2004 | Buckland |
| 6,826,711 | B2 | 11/2004 | Moulton et al. |
| 6,879,596 | B1 | 4/2005 | Dooply |
| 7,003,688 | B1 | 2/2006 | Pittelkow et al. |
| 7,024,451 | B2 | 4/2006 | Jorgenson |
| 7,024,609 | B2 | 4/2006 | Wolfgang et al. |
| 7,047,450 | B2 * | 5/2006 | Iwamitsu et al. ............... 714/43 |
| 7,080,101 | B1 | 7/2006 | Watson et al. |
| 7,103,824 | B2 | 9/2006 | Halford |
| 7,103,915 | B2 | 9/2006 | Redlich et al. |
| 7,111,115 | B2 | 9/2006 | Peters et al. |
| 7,140,044 | B2 | 11/2006 | Redlich et al. |
| 7,146,644 | B2 | 12/2006 | Redlich et al. |
| 7,171,493 | B2 | 1/2007 | Shu et al. |
| 7,222,133 | B1 | 5/2007 | Raipurkar et al. |
| 7,240,236 | B2 | 7/2007 | Cutts et al. |
| 7,272,613 | B2 | 9/2007 | Sim et al. |
| 7,636,724 | B2 | 12/2009 | de la Torre et al. |
| 2002/0062422 | A1 | 5/2002 | Butterworth et al. |
| 2002/0166079 | A1 | 11/2002 | Ulrich et al. |
| 2003/0018927 | A1 | 1/2003 | Gadir et al. |
| 2003/0037261 | A1 | 2/2003 | Meffert et al. |
| 2003/0065617 | A1 | 4/2003 | Watkins et al. |
| 2003/0084020 | A1 | 5/2003 | Shu |
| 2004/0024963 | A1 | 2/2004 | Talagala et al. |
| 2004/0049572 | A1 * | 3/2004 | Yamamoto et al. ........... 709/224 |
| 2004/0122917 | A1 | 6/2004 | Menon et al. |
| 2004/0215998 | A1 | 10/2004 | Buxton et al. |
| 2004/0228493 | A1 | 11/2004 | Ma |
| 2005/0100022 | A1 | 5/2005 | Ramprashad |
| 2005/0108444 | A1 * | 5/2005 | Flauaus et al. .................. 710/15 |
| 2005/0114594 | A1 | 5/2005 | Corbett et al. |
| 2005/0125593 | A1 | 6/2005 | Karpoff et al. |
| 2005/0131993 | A1 | 6/2005 | Fatula, Jr. |
| 2005/0132070 | A1 | 6/2005 | Redlich et al. |
| 2005/0144382 | A1 | 6/2005 | Schmisseur |
| 2005/0229069 | A1 | 10/2005 | Hassner et al. |
| 2006/0047907 | A1 | 3/2006 | Shiga et al. |
| 2006/0136448 | A1 | 6/2006 | Cialini et al. |
| 2006/0156059 | A1 | 7/2006 | Kitamura |
| 2006/0224603 | A1 | 10/2006 | Correll, Jr. |
| 2007/0079081 | A1 | 4/2007 | Gladwin et al. |
| 2007/0079082 | A1 | 4/2007 | Gladwin et al. |
| 2007/0079083 | A1 | 4/2007 | Gladwin et al. |
| 2007/0088970 | A1 | 4/2007 | Buxton et al. |
| 2007/0174192 | A1 | 7/2007 | Gladwin et al. |
| 2007/0174720 | A1 * | 7/2007 | Kubo et al. ..................... 714/42 |
| 2007/0214285 | A1 | 9/2007 | Au et al. |
| 2007/0234110 | A1 | 10/2007 | Soran et al. |
| 2007/0283167 | A1 | 12/2007 | Venters, III et al. |
| 2009/0063696 | A1 * | 3/2009 | Wang et al. ................... 709/232 |
| 2009/0094251 | A1 | 4/2009 | Gladwin et al. |
| 2009/0094318 | A1 | 4/2009 | Gladwin et al. |
| 2010/0023524 | A1 | 1/2010 | Gladwin et al. |
| 2011/0113282 | A1 * | 5/2011 | De Spiegeleer et al. ..... 714/6.13 |
| 2011/0173350 | A1 * | 7/2011 | Coronado et al. ................ 710/8 |

OTHER PUBLICATIONS

Rabin; Efficient Dispersal of Information for Security, Load Balancing, and Fault Tolerance; Journal of the Association for Computer Machinery; vol. 36, No. 2; Apr. 1989; pp. 335-348.

Chung; An Automatic Data Segmentation Method for 3D Measured Data Points; National Taiwan University; pp. 1-8; 1998.

Plank, T1: Erasure Codes for Storage Applications; FAST2005, 4th Usenix Conference on File Storage Technologies; Dec. 13-16, 2005; pp. 1-74.

Wildi; Java iSCSi Initiator; Master Thesis; Department of Computer and Information Science, University of Konstanz; Feb. 2007; 60 pgs.

Legg; Lightweight Directory Access Protocol (LDAP): Syntaxes and Matching Rules; IETF Network Working Group; RFC 4517; Jun. 2006; pp. 1-50.

Zeilenga; Lightweight Directory Access Protocol (LDAP): Internationalized String Preparation; IETF Network Working Group; RFC 4518; Jun. 2006; pp. 1-14.

Smith; Lightweight Directory Access Protocol (LDAP): Uniform Resource Locator; IETF Network Working Group; RFC 4516; Jun. 2006; pp. 1-15.

Smith; Lightweight Directory Access Protocol (LDAP): String Representation of Search Filters; IETF Network Working Group; RFC 4515; Jun. 2006; pp. 1-12.

Zeilenga; Lightweight Directory Access Protocol (LDAP): Directory Information Models; IETF Network Working Group; RFC 4512; Jun. 2006; pp. 1-49.

Sciberras; Lightweight Directory Access Protocol (LDAP): Schema for User Applications; IETF Network Working Group; RFC 4519; Jun. 2006; pp. 1-33.

Harrison; Lightweight Directory Access Protocol (LDAP): Authentication Methods and Security Mechanisms; IETF Network Working Group; RFC 4513; Jun. 2006; pp. 1-32.

Zeilenga; Lightweight Directory Access Protocol (LDAP): Technical Specification Road Map; IETF Network Working Group; RFC 4510; Jun. 2006; pp. 1-8.

Zeilenga; Lightweight Directory Access Protocol (LDAP): String Representation of Distinguished Names; IETF Network Working Group; RFC 4514; Jun. 2006; pp. 1-15.

Sermersheim; Lightweight Directory Access Protocol (LDAP): The Protocol; IETF Network Working Group; RFC 4511; Jun. 2006; pp. 1-68.

Satran, et al.; Internet Small Computer Systems Interface (iSCSI); IETF Network Working Group; RFC 3720; Apr. 2004; pp. 1-257.

Xin, et al.; Evaluation of Distributed Recovery in Large-Scale Storage Systems; 13th IEEE International Symposium on High Performance Distributed Computing; Jun. 2004; pp. 172-181.

Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.

* cited by examiner

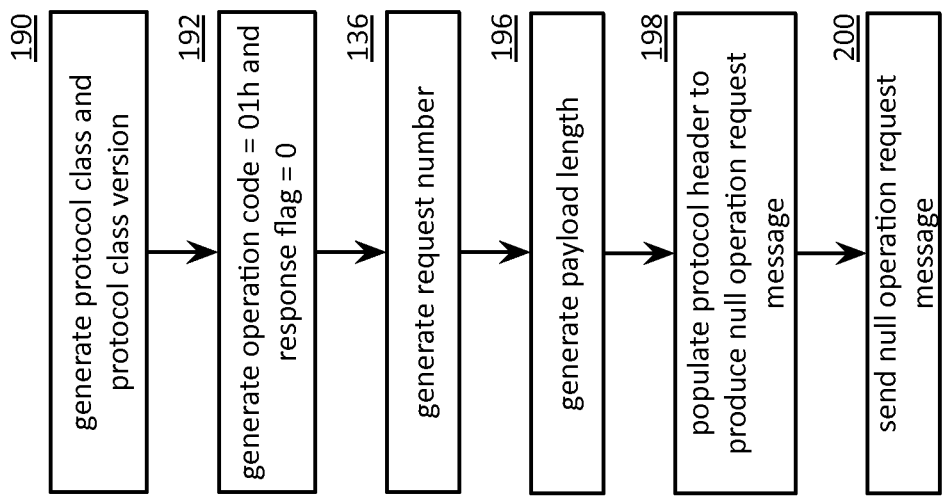
FIG. 9B
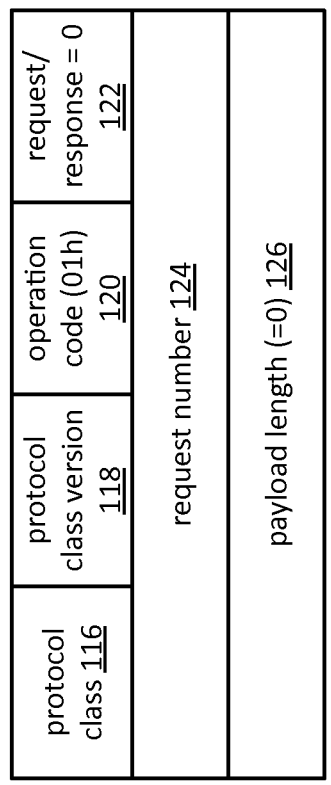
FIG. 9A
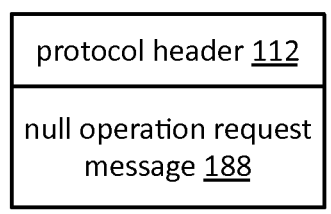

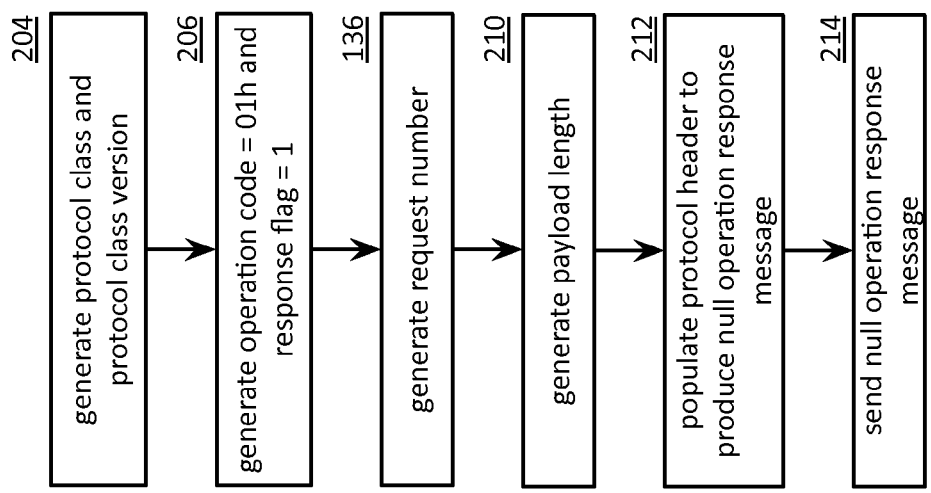
FIG. 10B
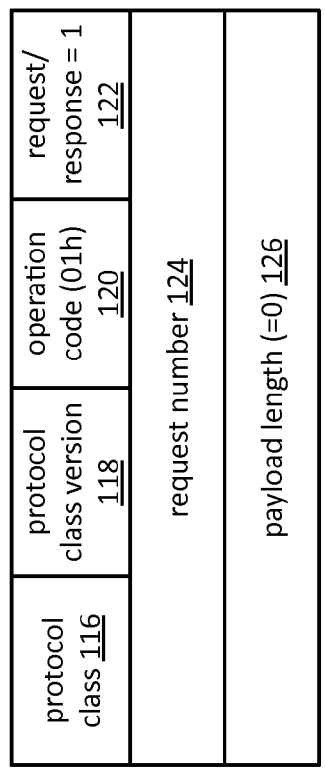
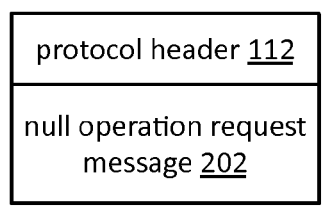
FIG. 10A

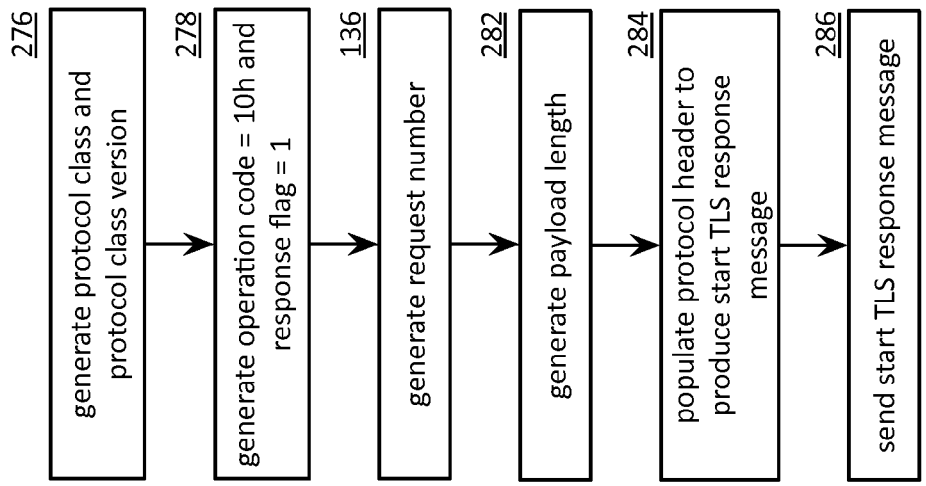
FIG. 14B
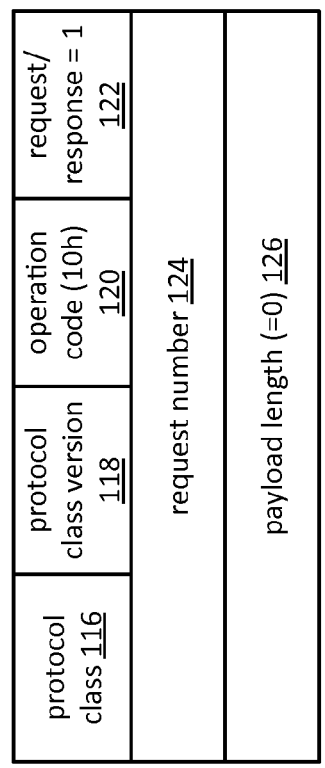
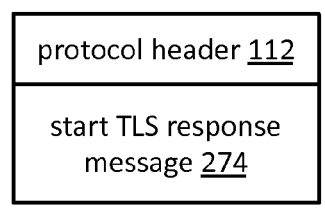
FIG. 14A

RESOLVING A PROTOCOL ISSUE WITHIN A DISPERSED STORAGE NETWORK

CROSS REFERENCE TO RELATED PATENTS

This patent application is claiming priority under 35 USC §119 to a provisionally filed patent application entitled DISPERSED STORAGE SYSTEM ACCESS PROTOCOL FORMAT AND METHOD, having a provisional filing date of Aug. 2, 2010, and a provisional Ser. No. 61/369,802, which is incorporated herein by reference, and is further claiming priority under 35 USC §120 as a continuation-in-part patent application of co-pending patent application entitled READ OPERATION DISPERSED STORAGE NETWORK FRAME, having a filing date of Apr. 5, 2011, a Ser. No. 13/080,431, a publication date of Oct. 27, 2011, and a publication number of 2011/0264823, which is incorporated herein by reference in its entirety and made part of the present U.S. Utility Patent Application for all purposes.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

1. Technical Field of the Invention

This invention relates generally to computing systems and more particularly to data storage solutions within such computing systems.

2. Description of Related Art

Computers are known to communicate, process, and store data. Such computers range from wireless smart phones to data centers that support millions of web searches, stock trades, or on-line purchases every day. In general, a computing system generates data and/or manipulates data from one form into another. For instance, an image sensor of the computing system generates raw picture data and, using an image compression program (e.g., JPEG, MPEG, etc.), the computing system manipulates the raw picture data into a standardized compressed image.

With continued advances in processing speed and communication speed, computers are capable of processing real time multimedia data for applications ranging from simple voice communications to streaming high definition video. As such, general-purpose information appliances are replacing purpose-built communications devices (e.g., a telephone). For example, smart phones can support telephony communications but they are also capable of text messaging and accessing the internet to perform functions including email, web browsing, remote applications access, and media communications (e.g., telephony voice, image transfer, music files, video files, real time video streaming. etc.).

Each type of computer is constructed and operates in accordance with one or more communication, processing, and storage standards. As a result of standardization and with advances in technology, more and more information content is being converted into digital formats. For example, more digital cameras are now being sold than film cameras, thus producing more digital pictures. As another example, web-based programming is becoming an alternative to over the air television broadcasts and/or cable broadcasts. As further examples, papers, books, video entertainment, home video, etc. are now being stored digitally, which increases the demand on the storage function of computers.

A typical computer storage system includes one or more memory devices aligned with the needs of the various operational aspects of the computer's processing and communication functions. Generally, the immediacy of access dictates what type of memory device is used. For example, random access memory (RAM) memory can be accessed in any random order with a constant response time, thus it is typically used for cache memory and main memory. By contrast, memory device technologies that require physical movement As magnetic disks, tapes, and optical discs, have a variable response time as the physical movement can take longer than the data transfer, thus they are typically used for secondary memory (e.g., hard drive, backup memory, etc.).

A computer's storage system will be compliant with one or more computer storage standards that include, but are not limited to, network file system (NFS), flash file system (FFS), disk file system (DFS), small computer system interface (SCSI), internet small computer system interface (iSCSI), file transfer protocol (FTP), and web-based distributed authoring and versioning (WebDAV). These standards specify the data storage format (e.g., files, data objects, data blocks, directories, etc.) and interfacing between the computer's processing function and its storage system, which is a primary function of the computer's memory controller.

Despite the standardization of the computer and its storage system, memory devices fail; especially commercial grade memory devices that utilize technologies incorporating physical movement (e.g., a disc drive). For example, it is fairly common for a disc drive to routinely suffer from bit level corruption and to completely fail after three years of use. One solution is to a higher-grade disc drive, which adds significant cost to a computer.

Another solution is to utilize multiple levels of redundant disc drives to replicate the data into two or more copies. One such redundant drive approach is called redundant array of independent discs (RAID). In a RAID device, a RAID controller adds parity data to the original data before storing it across the array. The parity data is calculated from the original data such that the failure of a disc will not result in the loss of the original data. For example, RAID 5 uses three discs to protect data from the failure of a single disc. The parity data, and associated redundancy overhead data, reduces the storage capacity of three independent discs by one third (e.g., n−1=capacity). RAID 6 can recover from a loss of two discs and requires a minimum of four discs with a storage capacity of n−2.

While RAID addresses the memory device failure issue, it is not without its own failures issues that affect its effectiveness, efficiency and security. For instance, as more discs are added to the array, the probability of a disc failure increases, which increases the demand for maintenance. For example, when a disc fails, it needs to be manually replaced before another disc fails and the data stored in the RAID device is lost. To reduce the risk of data loss, data on a RAID device is typically copied on to one or more other RAID devices. While this addresses the loss of data issue, it raises a security issue since multiple copies of data are available, which increases the chances of unauthorized access. Further, as the amount of data being stored grows, the overhead of RAID devices becomes a non-trivial efficiency issue.

BRIEF DESCRIPTION OF THE SEVERAL VIEWS OF THE DRAWING(S)

FIG. 9A is a diagram illustrating an example of a null operation request message format in accordance with the invention;

FIG. 9B is a flowchart illustrating an example of generating a null operation request message in accordance with the invention;

FIG. 10A is a diagram illustrating an example of a null operation response message format in accordance with the invention;

FIG. 10B is a flowchart illustrating an example of generating a null operation response message in accordance with the invention;

FIG. 14A is a diagram illustrating an example of a start transport layer security (TLS) response message format in accordance with the invention;

FIG. 14B is a flowchart illustrating an example of generating a start transport layer security (TLS) response message in accordance with the invention;

DETAILED DESCRIPTION OF THE INVENTION

Figure 1:
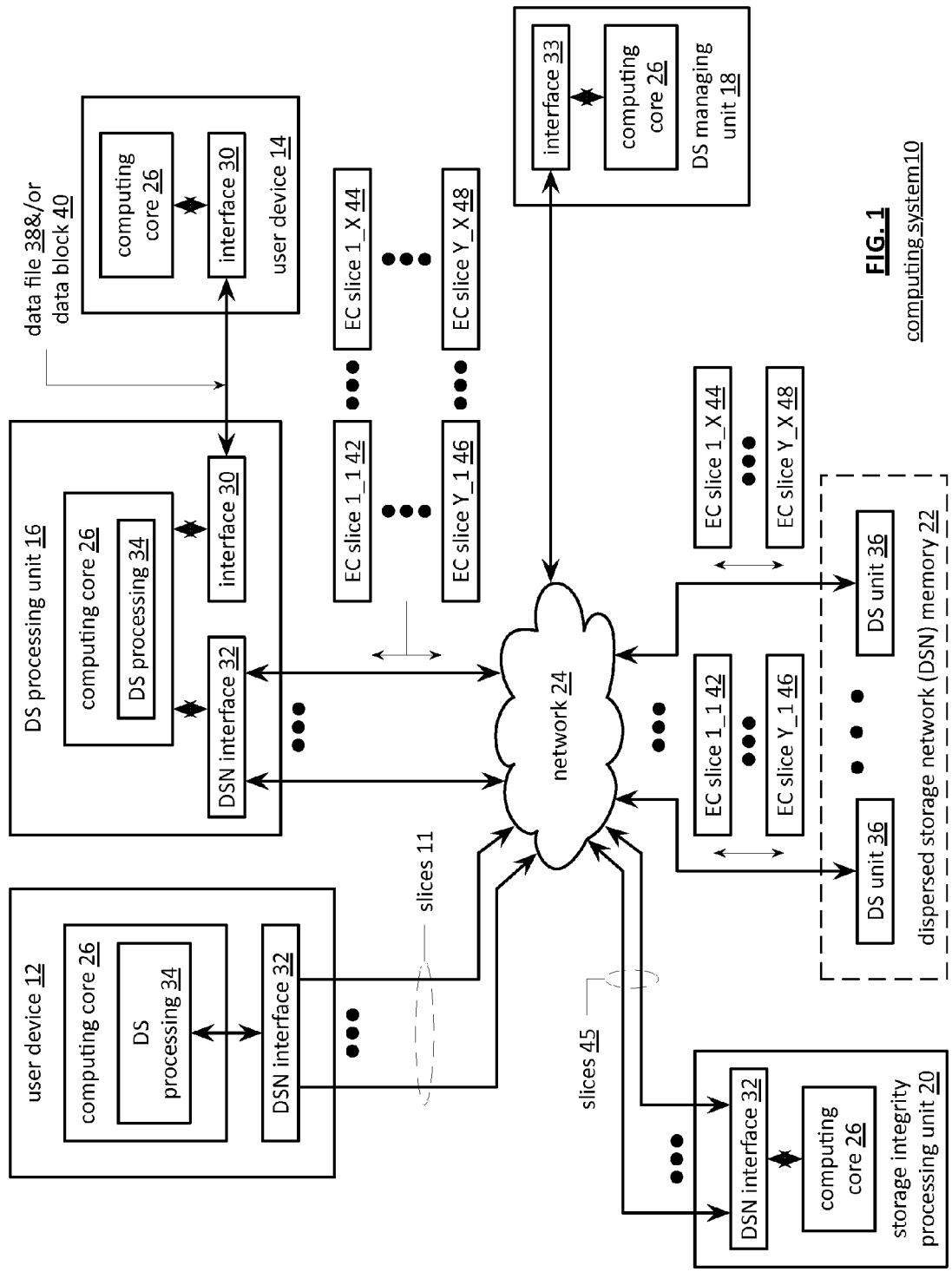
FIG. 1 is a schematic block diagram of an embodiment of a computing system in accordance with the invention.

FIG. 1 is a schematic block diagram of a computing system 10 that includes one or more of a first type of user devices 12, one or more of a second type of user devices 14, at least one distributed storage (DS) processing unit 16, at least one DS managing unit 18, at least one storage integrity processing unit 20, and a distributed storage network (DSN) memory 22 coupled via a network 24. The network 24 may include one or more wireless and/or wire lined communication systems; one or more private intranet systems and/or public internet systems; and/or one or more local area networks (LAN) and/or wide area networks (WAN).

The DSN memory 22 includes a plurality of distributed storage (DS) units 36 for storing data of the system. Each of the DS units 36 includes a processing module and memory and may be located at a geographically different site than the other DS units (e.g., one in Chicago, one in Milwaukee, etc.). The processing module may be a single processing device or a plurality of processing devices. A processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module may have an associated memory and/or memory element, which may be a single memory device, a plurality of memory devices, and/or embedded circuitry of the processing module. A memory device may be a read-only memory, random access memory, volatile memory, non-volatile memory, static memory, dynamic memory, flash memory, cache memory, and/or any device that stores digital information. Note that if the processing module includes more than one processing device, the processing devices may be centrally located (e.g., directly coupled together via a wired and/or wireless bus structure) or may be distributedly located (e.g., cloud computing via indirect coupling via a local area network and/or a wide area network). Further note that when the processing module implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element stores, and the processing module executes, hard coded and/or operational instructions corresponding to at least some of the steps and/or functions illustrated in FIGS. 1-17B.

Each of the user devices 12-14, the DS processing unit 16, the DS managing unit 18, and the storage integrity processing unit 20 may be a portable computing device (e.g., a social networking device, a gaming device, a cell phone, a smart phone, a personal digital assistant, a digital music player, a digital video player, a laptop computer, a handheld computer, a video game controller, and/or any other portable device that includes a computing core) and/or a fixed computing device (e.g., a personal computer, a computer server, a cable set-top box, a satellite receiver, a television set, a printer, a fax machine, home entertainment equipment, a video game console, and/or any type of home or office computing equipment). A portable or fixed computing device includes a computing core 26 and one or more interfaces 30, 32, and/or 33. An embodiment of the computing core 26 will be described with reference to FIG. 2.

With respect to the interfaces, each of the interfaces 30, 32, and 33 includes software and/or hardware to support one or more communication links via the network 24 and/or directly. For example, interfaces 30 support a communication link (wired, wireless, direct, via a LAN, via the network 24, etc.) between the first type of user device 14 and the DS processing unit 16. As another example, DSN interface 32 supports a plurality of communication links via the network 24 between the DSN memory 22 and the DS processing unit 16, the first type of user device 12, and/or the storage integrity processing unit 20. As yet another example, interface 33 supports a communication link between the DS managing unit 18 and any one of the other devices and/or units 12, 14, 16, 20, and/or 22 via the network 24.

In general and with respect to data storage, the system 10 supports three primary functions: distributed network data storage management, distributed data storage and retrieval, and data storage integrity verification. In accordance with these three primary functions, data can be distributedly stored in a plurality of physically different locations and subsequently retrieved in a reliable and secure manner regardless of failures of individual storage devices, failures of network equipment, the duration of storage, the amount of data being stored, attempts at hacking the data, etc.

The DS managing unit 18 performs distributed network data storage management functions, which include establishing distributed data storage parameters, performing network operations, performing network administration, and/or performing network maintenance. The DS managing unit 18 establishes the distributed data storage parameters (e.g., allocation of virtual DSN memory space, distributed storage parameters, security parameters, billing information, user profile information, etc.) for one or more of the user devices 12-14 (e.g., established for individual devices, established for a user group of devices, established for public access by the user devices, etc.). For example, the DS managing unit 18 coordinates the creation of a vault (e.g., a virtual memory block) within the DSN memory 22 for a user device (for a group of devices, or for public access). The DS managing unit 18 also determines the distributed data storage parameters for the vault. In particular, the DS managing unit 18 determines a number of slices (e.g., the number that a data segment of a data file and/or data block is partitioned into for distributed storage) and a read threshold value (e.g., the minimum number of slices required to reconstruct the data segment).

As another example, the DS managing module 18 creates and stores, locally or within the DSN memory 22, user profile information. The user profile information includes one or more of authentication information, permissions, and/or the security parameters. The security parameters may include one or more of encryption/decryption scheme, one or more encryption keys, key generation scheme, and data encoding/decoding scheme.

As yet another example, the DS managing unit 18 creates billing information for a particular user, user group, vault access, public vault access, etc. For instance, the DS managing unit 18 tracks the number of times user accesses a private vault and/or public vaults, which can be used to generate a per-access bill. In another instance, the DS managing unit 18 tracks the amount of data stored and/or retrieved by a user device and/or a user group, which can be used to generate a per-data-amount bill.

The DS managing unit 18 also performs network operations, network administration, and/or network maintenance. As at least part of performing the network operations and/or administration, the DS managing unit 18 monitors performance of the devices and/or units of the system 10 for potential failures, determines the devices and/or unit's activation status, determines the devices' and/or units' loading, and any other system level operation that affects the performance level of the system 10. For example, the DS managing unit 18 receives and aggregates network management alarms, alerts, errors, status information, performance information, and messages from the devices 12-14 and/or the units 16, 20, 22. For example, the DS managing unit 18 receives a simple network management protocol (SNMP) message regarding the status of the DS processing unit 16.

The DS managing unit 18 performs the network maintenance by identifying equipment within the system 10 that needs replacing, upgrading, repairing, and/or expanding. For example, the DS managing unit 18 determines that the DSN memory 22 needs more DS units 36 or that one or more of the DS units 36 needs updating.

The second primary function (i.e., distributed data storage and retrieval) begins and ends with a user device 12-14. For instance, if a second type of user device 14 has a data file 38 and/or data block 40 to store in the DSN memory 22, it send the data file 38 and/or data block 40 to the DS processing unit 16 via its interface 30. As will be described in greater detail with reference to FIG. 2, the interface 30 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). In addition, the interface 30 may attach a user identification code (ID) to the data file 38 and/or data block 40.

The DS processing unit 16 receives the data file 38 and/or data block 40 via its interface 30 and performs a distributed storage (DS) process 34 thereon (e.g., an error coding dispersal storage function). The DS processing 34 begins by partitioning the data file 38 and/or data block 40 into one or more data segments, which is represented as Y data segments. For example, the DS processing 34 may partition the data file 38 and/or data block 40 into a fixed byte size segment (e.g., $2^1$ to $2^n$ bytes, where n=>2) or a variable byte size (e.g., change byte size from segment to segment, or from groups of segments to groups of segments, etc.).

For each of the Y data segments, the DS processing 34 error encodes (e.g., forward error correction (FEC), information dispersal algorithm, or error correction coding) and slices (or slices then error encodes) the data segment into a plurality of error coded (EC) data slices 42-48, which is represented as X slices per data segment. The number of slices (X) per segment, which corresponds to a number of pillars n, is set in accordance with the distributed data storage parameters and the error coding scheme. For example, if a Reed-Solomon (or other FEC scheme) is used in an n/k system, then a data segment is divided into n slices, where k number of slices is needed to reconstruct the original data (i.e., k is the threshold). As a few specific examples, the n/k factor may be 5/3; 6/4; 8/6; 8/5; 16/10.

For each slice 42-48, the DS processing unit 16 creates a unique slice name and appends it to the corresponding slice 42-48. The slice name includes universal DSN memory addressing routing information (e.g., virtual memory addresses in the DSN memory 22) and user-specific information (e.g., user ID, file name, data block identifier, etc.).

The DS processing unit 16 transmits the plurality of EC slices 42-48 to a plurality of DS units 36 of the DSN memory 22 via the DSN interface 32 and the network 24. The DSN interface 32 formats each of the slices for transmission via the network 24. For example, the DSN interface 32 may utilize an internet protocol (e.g., TCP/IP, etc.) to packetize the slices 42-48 for transmission via the network 24.

The number of DS units 36 receiving the slices 42-48 is dependent on the distributed data storage parameters established by the DS managing unit 18. For example, the DS managing unit 18 may indicate that each slice is to be stored in a different DS unit 36. As another example, the DS managing unit 18 may indicate that like slice numbers of different data segments are to be stored in the same DS unit 36. For example, the first slice of each of the data segments is to be stored in a first DS unit 36, the second slice of each of the data segments is to be stored in a second DS unit 36, etc. In this manner, the data is encoded and distributedly stored at physically diverse locations to improved data storage integrity and security. Further examples of encoding the data segments will be provided with reference to one or more of FIGS. 2-17B.

Each DS unit 36 that receives a slice 42-48 for storage translates the virtual DSN memory address of the slice into a local physical address for storage. Accordingly, each DS unit 36 maintains a virtual to physical memory mapping to assist in the storage and retrieval of data.

The first type of user device 12 performs a similar function to store data in the DSN memory 22 with the exception that it includes the DS processing. As such, the device 12 encodes and slices the data file and/or data block it has to store. The device then transmits the slices 11 to the DSN memory via its DSN interface 32 and the network 24.

For a second type of user device 14 to retrieve a data file or data block from memory, it issues a read command via its interface 30 to the DS processing unit 16. The DS processing unit 16 performs the DS processing 34 to identify the DS units 36 storing the slices of the data file and/or data block based on the read command. The DS processing unit 16 may also communicate with the DS managing unit 18 to verify that the user device 14 is authorized to access the requested data.

Assuming that the user device is authorized to access the requested data, the DS processing unit 16 issues slice read commands to at least a threshold number of the DS units 36 storing the requested data (e.g., to at least 10 DS units for a 16/10 error coding scheme). Each of the DS units 36 receiving the slice read command, verifies the command, accesses its virtual to physical memory mapping, retrieves the requested slice, or slices, and transmits it to the DS processing unit 16.

Once the DS processing unit 16 has received a read threshold number of slices for a data segment, it performs an error decoding function and de-slicing to reconstruct the data segment. When Y number of data segments has been reconstructed, the DS processing unit 16 provides the data file 38 and/or data block 40 to the user device 14. Note that the first type of user device 12 performs a similar process to retrieve a data file and/or data block.

The storage integrity processing unit 20 performs the third primary function of data storage integrity verification. In general, the storage integrity processing unit 20 periodically retrieves slices 45, and/or slice names, of a data file or data block of a user device to verify that one or more slices have not been corrupted or lost (e.g., the DS unit failed). The retrieval process mimics the read process previously described.

If the storage integrity processing unit 20 determines that one or more slices is corrupted or lost, it rebuilds the corrupted or lost slice(s) in accordance with the error coding scheme. The storage integrity processing unit 20 stores the rebuild slice, or slices, in the appropriate DS unit(s) 36 in a manner that mimics the write process previously described.

Figure 2:
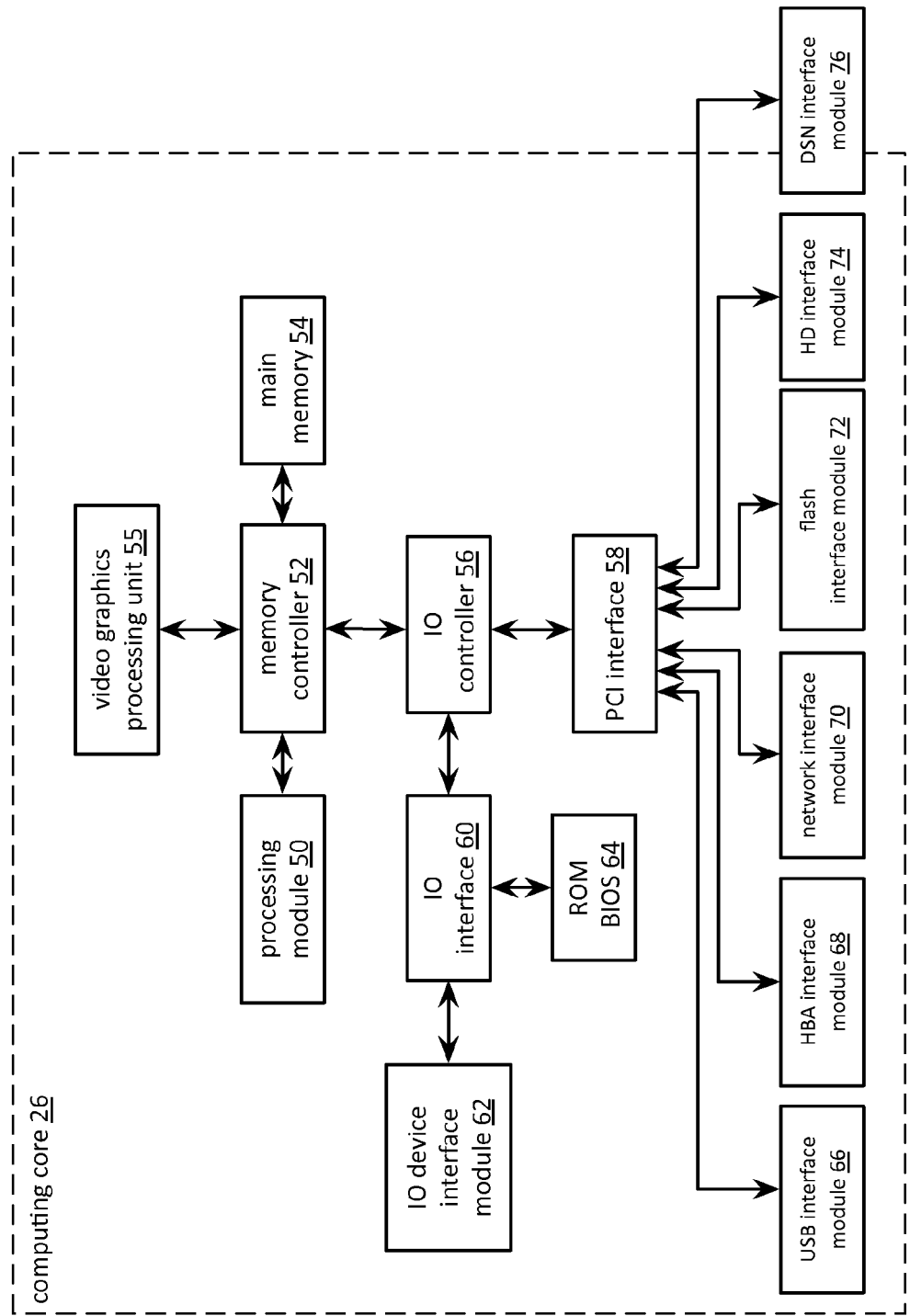
FIG. 2 is a schematic block diagram of an embodiment of a computing core in accordance with the invention.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, at least one IO device interface module 62, a read only memory (ROM) basic input output system (BIOS) 64, and one or more memory interface modules. The memory interface module(s) includes one or more of a universal serial bus (USB) interface module 66, a host bus adapter (HBA) interface module 68, a network interface module 70, a flash interface module 72, a hard drive interface module 74, and a DSN interface module 76. Note the DSN interface module 76 and/or the network interface module 70 may function as the interface 30 of the user device 14 of FIG. 1. Further note that the IO device interface module 62 and/or the memory interface modules may be collectively or individually referred to as IO ports.

The processing module 50 may be a single processing device or a plurality of processing devices. A processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module 50 may have an associated memory and/or memory element, which may be a single memory device, a plurality of memory devices, and/or embedded circuitry of the processing module 50. A memory device may be a read-only memory, random access memory, volatile memory, non-volatile memory, static memory, dynamic memory, flash memory, cache memory, and/or any device that stores digital information. Note that if the processing module 50 includes more than one processing device, the processing devices may be centrally located (e.g., directly coupled together via a wired and/or wireless bus structure) or may be distributedly located (e.g., cloud computing via indirect coupling via a local area network and/or a wide area network). Further note that when the processing module 50 implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element stores, and the processing module 50 executes, hard coded and/or operational instructions corresponding to at least some of the steps and/or functions illustrated in FIGS. 1-17B.

Figure 3:
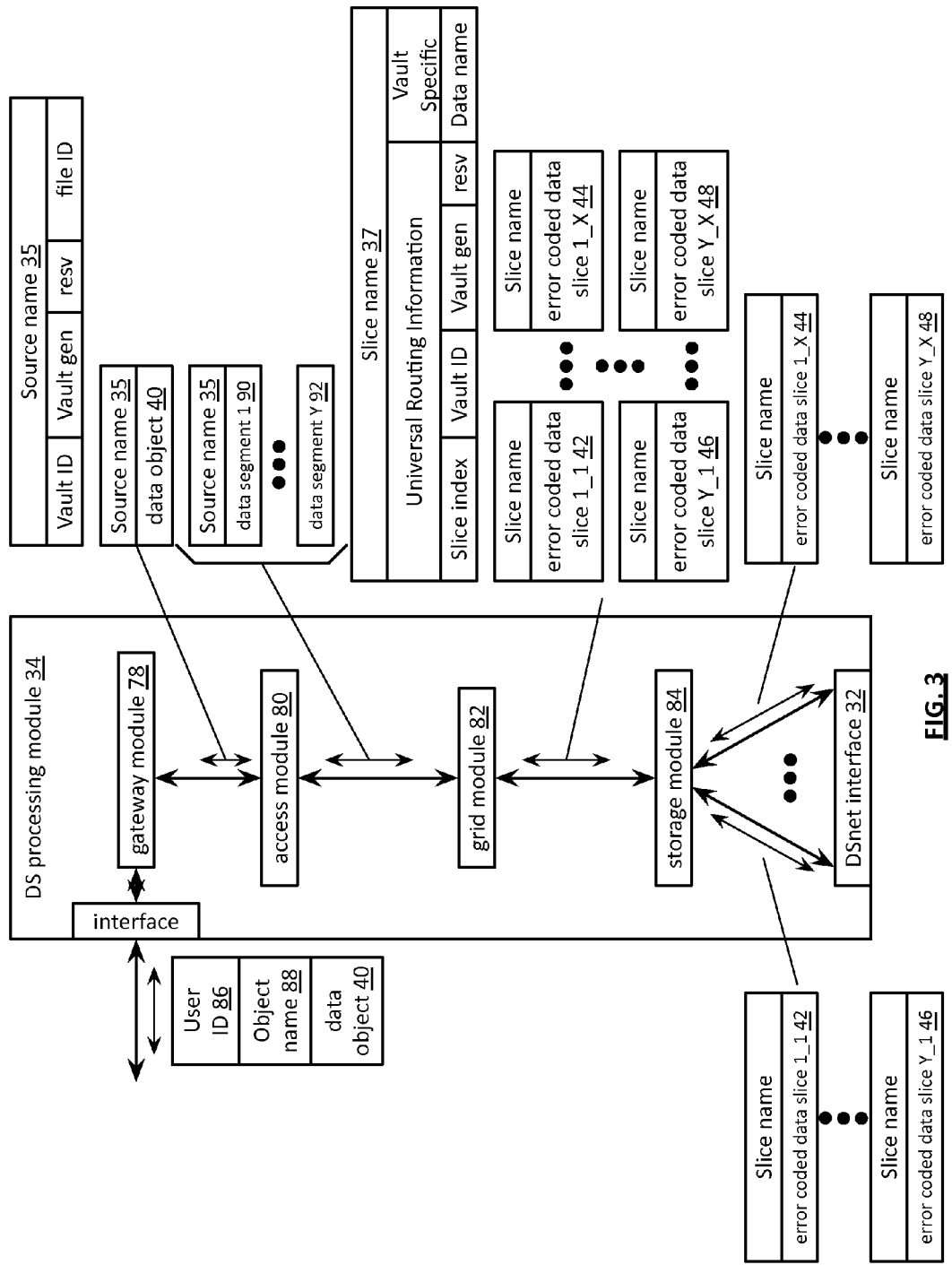
FIG. 3 is a schematic block diagram of an embodiment of a distributed storage processing unit in accordance with the invention.

FIG. 3 is a schematic block diagram of an embodiment of a dispersed storage (DS) processing module 34 of user device 12 and/or of the DS processing unit 16. The DS processing module 34 includes a gateway module 78, an access module 80, a grid module 82, and a storage module 84. The DS processing module 34 may also include an interface 30 and the DSnet interface 32 or the interfaces 68 and/or 70 may be part of user 12 or of the DS processing unit 14. The DS processing module 34 may further include a bypass/feedback path between the storage module 84 to the gateway module 78. Note that the modules 78-84 of the DS processing module 34 may be in a single unit or distributed across multiple units.

In an example of storing data, the gateway module 78 receives an incoming data object that includes a user ID field 86, an object name field 88, and the data field 40 and may also receive corresponding information that includes a process identifier (e.g., an internal process/application ID), metadata, a file system directory, a block number, a transaction message, a user device identity (ID), a data object identifier, a source name, and/or user information. The gateway module 78 authenticates the user associated with the data object by verifying the user ID 86 with the managing unit 18 and/or another authenticating unit.

When the user is authenticated, the gateway module 78 obtains user information from the management unit 18, the user device, and/or the other authenticating unit. The user information includes a vault identifier, operational parameters, and user attributes (e.g., user data, billing information, etc.). A vault identifier identifies a vault, which is a virtual memory space that maps to a set of DS storage units 36. For example, vault 1 (i.e., user 1's DSN memory space) includes eight DS storage units (X=8 wide) and vault 2 (i.e., user 2's DSN memory space) includes sixteen DS storage units (X=16 wide). The operational parameters may include an error coding algorithm, the width n (number of pillars X or slices per segment for this vault), a read threshold T, a write threshold, an encryption algorithm, a slicing parameter, a compression algorithm, an integrity check method, caching settings, parallelism settings, and/or other parameters that may be used to access the DSN memory layer.

The gateway module 78 uses the user information to assign a source name 35 to the data. For instance, the gateway module 60 determines the source name 35 of the data object 40 based on the vault identifier and the data object. For example, the source name may contain a file identifier (ID), a vault generation number, a reserved field, and a vault identifier (ID). As another example, the gateway module 78 may generate the file ID based on a hash function of the data object 40. Note that the gateway module 78 may also perform message conversion, protocol conversion, electrical conversion, optical conversion, access control, user identification, user information retrieval, traffic monitoring, statistics generation, configuration, management, and/or source name determination.

The access module 80 receives the data object 40 and creates a series of data segments 1 through Y 90-92 in accordance with a data storage protocol (e.g., file storage system, a block storage system, and/or an aggregated block storage system). The number of segments Y may be chosen or randomly assigned based on a selected segment size and the size of the data object. For example, if the number of segments is chosen to be a fixed number, then the size of the segments varies as a function of the size of the data object. For instance, if the data object is an image file of 4,194,304 eight bit bytes (e.g., 33,554,432 bits) and the number of segments Y=131,072, then each segment is 256 bits or 32 bytes. As another example, if segment sized is fixed, then the number of segments Y varies based on the size of data object. For instance, if the data object is an image file of 4,194,304 bytes and the fixed size of each segment is 4,096 bytes, the then number of segments Y=1,024. Note that each segment is associated with the same source name.

The grid module 82 receives the data segments and may manipulate (e.g., compression, encryption, cyclic redundancy check (CRC), etc.) each of the data segments before performing an error coding function of the error coding dispersal storage function to produce a pre-manipulated data segment. After manipulating a data segment, if applicable, the grid module 82 error encodes (e.g., Reed-Solomon, Convolution encoding, Trellis encoding, etc.) the data segment or manipulated data segment into X error coded data slices 42-44.

The value X, or the number of pillars (e.g., X=16), is chosen as a parameter of the error coding dispersal storage function. Other parameters of the error coding dispersal function include a read threshold T, a write threshold W, etc. The read threshold (e.g., T=10, when X=16) corresponds to the minimum number of error-free error coded data slices required to reconstruct the data segment. In other words, the DS processing module 34 can compensate for X−T (e.g., 16-10=6) missing error coded data slices per data segment. The write threshold W corresponds to a minimum number of DS storage units that acknowledge proper storage of their respective data slices before the DS processing module indicates proper storage of the encoded data segment. Note that the write threshold is greater than or equal to the read threshold for a given number of pillars (X).

For each data slice of a data segment, the grid module 82 generates a unique slice name 37 and attaches it thereto. The slice name 37 includes a universal routing information field and a vault specific field and may be 48 bytes (e.g., 24 bytes for each of the universal routing information field and the vault specific field). As illustrated, the universal routing information field includes a slice index, a vault ID, a vault generation, and a reserved field. The slice index is based on the pillar number and the vault ID and, as such, is unique for each pillar (e.g., slices of the same pillar for the same vault for any segment will share the same slice index). The vault specific field includes a data name, which includes a file ID and a segment number (e.g., a sequential numbering of data segments 1-Y of a simple data object or a data block number).

Prior to outputting the error coded data slices of a data segment, the grid module may perform post-slice manipulation on the slices. If enabled, the manipulation includes slice level compression, encryption, CRC, addressing, tagging, and/or other manipulation to improve the effectiveness of the computing system.

When the error coded data slices of a data segment are ready to be outputted, the grid module 82 determines which of the DS storage units 36 will store the EC data slices based on a dispersed storage memory mapping associated with the user's vault and/or DS storage unit attributes. The DS storage unit attributes may include availability, self-selection, performance history, link speed, link latency, ownership, available DSN memory, domain, cost, a prioritization scheme, a centralized selection message from another source, a lookup table, data ownership, and/or any other factor to optimize the operation of the computing system. Note that the number of DS storage units 36 is equal to or greater than the number of pillars (e.g., X) so that no more than one error coded data slice of the same data segment is stored on the same DS storage unit 36. Further note that EC data slices of the same pillar number but of different segments (e.g., EC data slice 1 of data segment 1 and EC data slice 1 of data segment 2) may be stored on the same or different DS storage units 36.

The storage module 84 performs an integrity check on the outbound encoded data slices and, when successful, identifies a plurality of DS storage units based on information provided by the grid module 82. The storage module 84 then outputs the encoded data slices 1 through X of each segment 1 through Y to the DS storage units 36. Each of the DS storage units 36 stores its EC data slice(s) and maintains a local virtual DSN address to physical location table to convert the virtual DSN address of the EC data slice(s) into physical storage addresses.

In an example of a read operation, the user device 12 and/or 14 sends a read request to the DS processing unit 14, which authenticates the request. When the request is authentic, the DS processing unit 14 sends a read message to each of the DS storage units 36 storing slices of the data object being read. The slices are received via the DSnet interface 32 and processed by the storage module 84, which performs a parity check and provides the slices to the grid module 82 when the parity check was successful. The grid module 82 decodes the slices in accordance with the error coding dispersal storage function to reconstruct the data segment. The access module 80 reconstructs the data object from the data segments and the gateway module 78 formats the data object for transmission to the user device.

Figure 4:
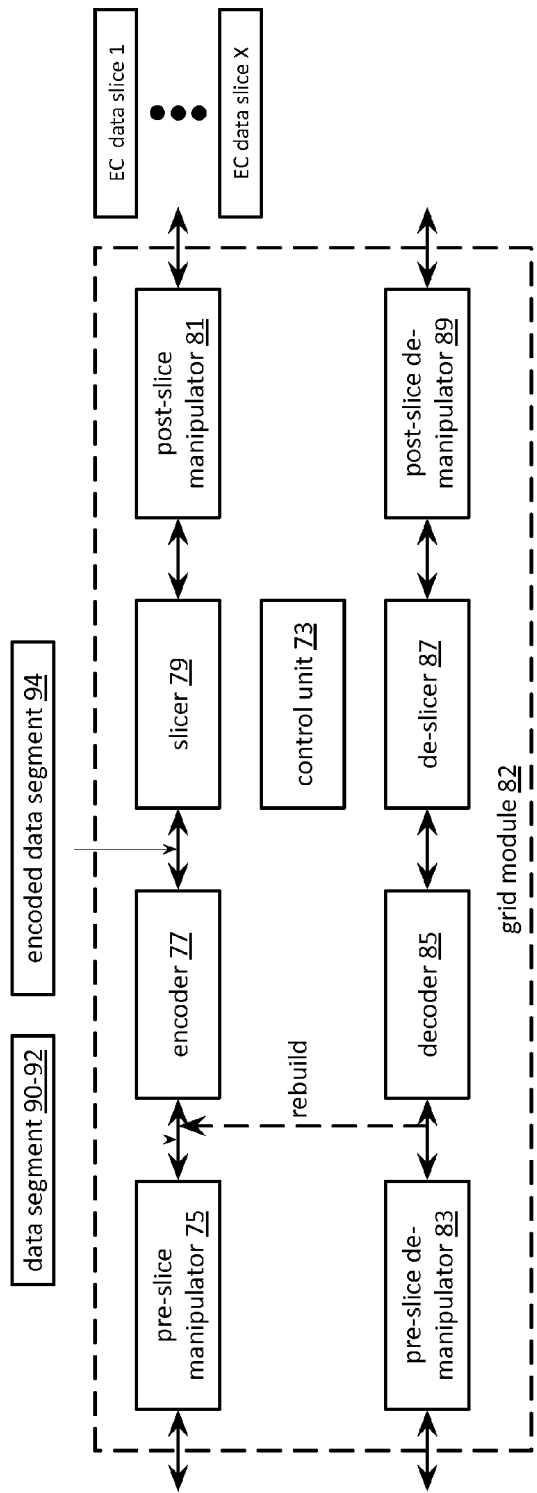
FIG. 4 is a schematic block diagram of an embodiment of a grid module in accordance with the invention.

FIG. 4 is a schematic block diagram of an embodiment of a grid module 82 that includes a control unit 73, a pre-slice manipulator 75, an encoder 77, a slicer 79, a post-slice manipulator 81, a pre-slice de-manipulator 83, a decoder 85, a de-slicer 87, and/or a post-slice de-manipulator 89. Note that the control unit 73 may be partially or completely external to the grid module 82. For example, the control unit 73 may be part of the computing core at a remote location, part of a user device, part of the DS managing unit 18, or distributed amongst one or more DS storage units.

In an example of write operation, the pre-slice manipulator 75 receives a data segment 90-92 and a write instruction from an authorized user device. The pre-slice manipulator 75 determines if pre-manipulation of the data segment 90-92 is required and, if so, what type. The pre-slice manipulator 75 may make the determination independently or based on instructions from the control unit 73, where the determination is based on a computing system-wide predetermination, a table lookup, vault parameters associated with the user identification, the type of data, security requirements, available DSN memory, performance requirements, and/or other metadata.

Once a positive determination is made, the pre-slice manipulator 75 manipulates the data segment 90-92 in accordance with the type of manipulation. For example, the type of manipulation may be compression (e.g., Lempel-Ziv-Welch, Huffman, Golomb, fractal, wavelet, etc.), signatures (e.g., Digital Signature Algorithm (DSA), Elliptic Curve DSA, Secure Hash Algorithm, etc.), watermarking, tagging, encryption (e.g., Data Encryption Standard, Advanced Encryption Standard, etc.), adding metadata (e.g., time/date stamping, user information, file type, etc.), cyclic redundancy check (e.g., CRC32), and/or other data manipulations to produce the pre-manipulated data segment.

The encoder 77 encodes the pre-manipulated data segment 92 using a forward error correction (FEC) encoder (and/or other type of erasure coding and/or error coding) to produce an encoded data segment 94. The encoder 77 determines which forward error correction algorithm to use based on a predetermination associated with the user's vault, a time based algorithm, user direction, DS managing unit direction, control unit direction, as a function of the data type, as a function of the data segment 92 metadata, and/or any other factor to determine algorithm type. The forward error correction algorithm may be Golay, Multidimensional parity, Reed-Solomon, Hamming, Bose Ray Chauduri Hocquenghem (BCH), Cauchy-Reed-Solomon, or any other FEC encoder. Note that the encoder 77 may use a different encoding algorithm for each data segment 92, the same encoding algorithm for the data segments 92 of a data object, or a combination thereof.

The encoded data segment 94 is of greater size than the data segment 92 by the overhead rate of the encoding algorithm by a factor of X/T, where X is the width or number of slices, and T is the read threshold. In this regard, the corresponding decoding process can accommodate at most X−T missing EC data slices and still recreate the data segment 92. For example, if X=16 and T=10, then the data segment 92 will be recoverable as long as 10 or more EC data slices per segment are not corrupted.

The slicer 79 transforms the encoded data segment 94 into EC data slices in accordance with the slicing parameter from the vault for this user and/or data segment 92. For example, if the slicing parameter is X=16, then the slicer 79 slices each encoded data segment 94 into 16 encoded slices.

The post-slice manipulator 81 performs, if enabled, post-manipulation on the encoded slices to produce the EC data slices. If enabled, the post-slice manipulator 81 determines the type of post-manipulation, which may be based on a computing system-wide predetermination, parameters in the vault for this user, a table lookup, the user identification, the type of data, security requirements, available DSN memory, performance requirements, control unit directed, and/or other metadata. Note that the type of post-slice manipulation may include slice level compression, signatures, encryption, CRC, addressing, watermarking, tagging, adding metadata, and/or other manipulation to improve the effectiveness of the computing system.

In an example of a read operation, the post-slice de-manipulator 89 receives at least a read threshold number of EC data slices and performs the inverse function of the post-slice manipulator 81 to produce a plurality of encoded slices. The de-slicer 87 de-slices the encoded slices to produce an encoded data segment 94. The decoder 85 performs the inverse function of the encoder 77 to recapture the data segment 90-92. The pre-slice de-manipulator 83 performs the inverse function of the pre-slice manipulator 75 to recapture the data segment 90-92.

Figure 5:
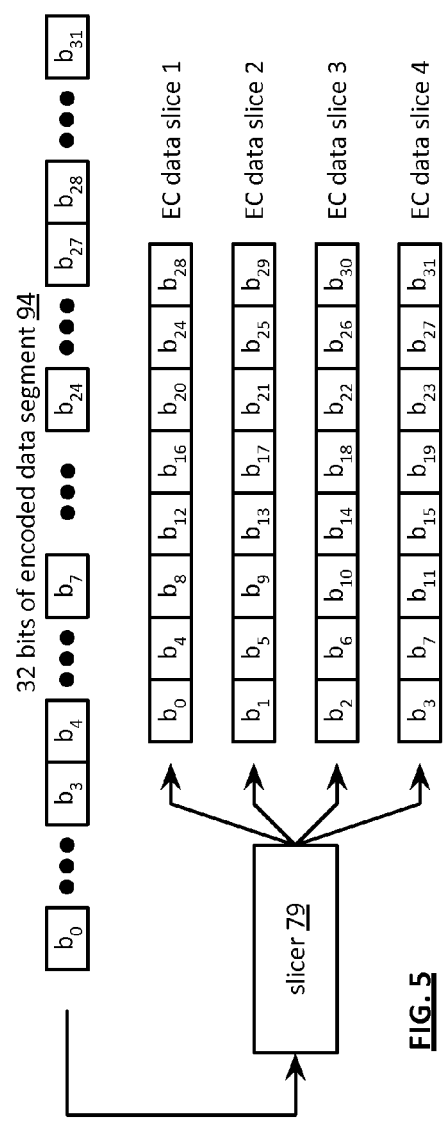
FIG. 5 is a diagram of an example embodiment of error coded data slice creation in accordance with the invention.

FIG. 5 is a diagram of an example of slicing an encoded data segment 94 by the slicer 79. In this example, the encoded data segment 94 includes thirty-two bits, but may include more or less bits. The slicer 79 disperses the bits of the encoded data segment 94 across the EC data slices in a pattern as shown. As such, each EC data slice does not include consecutive bits of the data segment 94 reducing the impact of consecutive bit failures on data recovery. For example, if EC data slice 2 (which includes bits 1, 5, 9, 13, 17, 25, and 29) is unavailable (e.g., lost, inaccessible, or corrupted), the data segment can be reconstructed from the other EC data slices (e.g., 1, 3 and 4 for a read threshold of 3 and a width of 4).

Figure 6B:
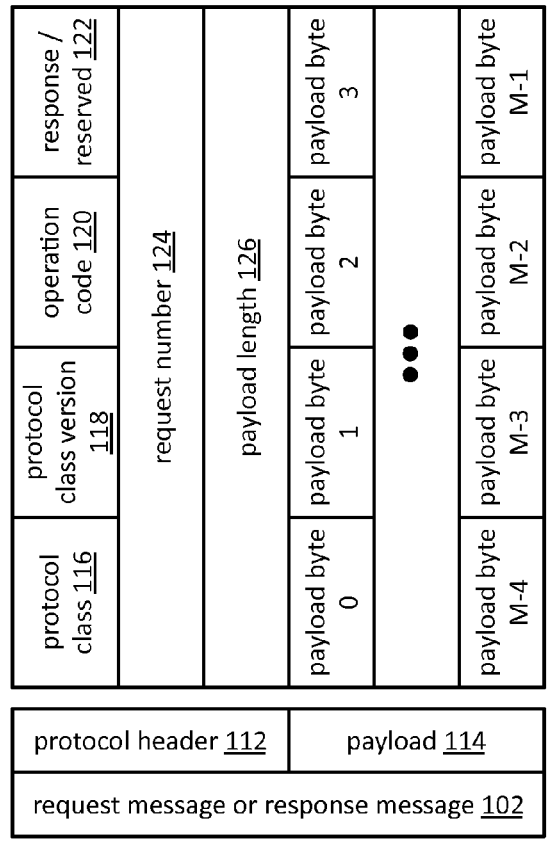
FIG. 6B is a block diagram of an embodiment of a message format in accordance with the invention.
Figure 6A:
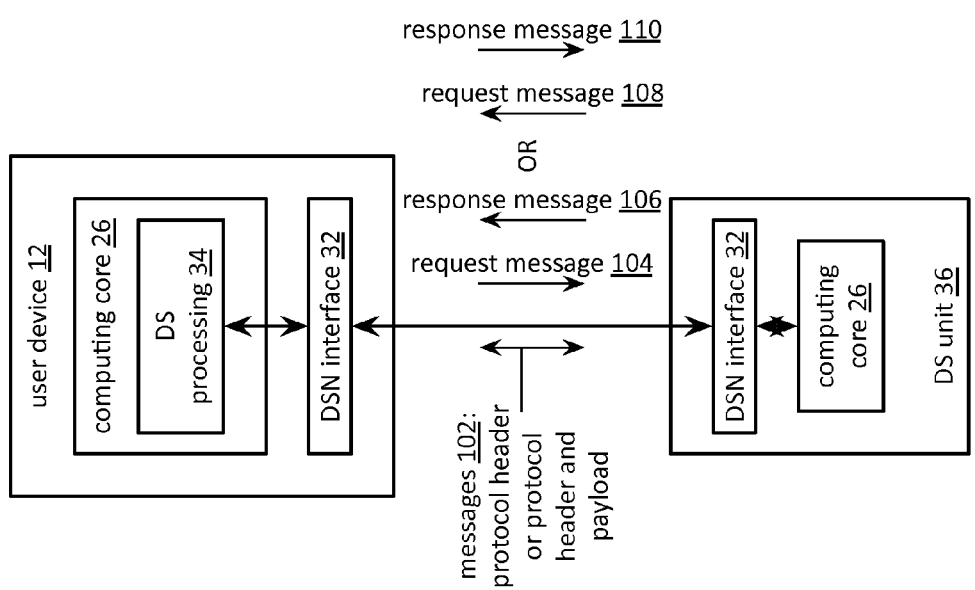
FIG. 6A is a schematic block diagram of another embodiment of a computing system in accordance with the invention.

FIG. 6A is a schematic block diagram of another embodiment of a computing system which includes a user device 12 and a dispersed storage (DS) unit 36. The user device 12 includes a computing core 26 and a dispersed storage network (DSN) interface 32. The computing core 26 includes a DS processing 34. The DS unit 36 includes a computing core 26 and the DSN interface 32. The user device 12 and the DS unit 36 are operably coupled such that the DSN interface 32 of the user device 12 provides communications with the DS unit 36 via the DSN interface 32 of the DS unit 36. The DSN interface 32 of the user device 12 and the DSN interface 32 of the DS unit 36 generate one or more DSN frames to communicate messages 102 between the user device 12 and the DS unit 36. A DSN frame communicates messages 102, wherein the DSN frame include a protocol header. Alternatively, the DSN frame includes the protocol header and a payload. A format of the DSN is discussed in greater detail with reference to FIG. 6B.

The messages 102 include request messages 104, 108 and response messages 106, 110, wherein the response messages 106, 110 are formed in response to a corresponding request message of request messages 104, 108. A requester generates and sends a request message 104, 108 to a responder. The responder generates and sends the response message 106, 110 to the requester. For example, the requester generates and sends a read request message 104 to solicit a retrieval action and the responder generates and sends a corresponding read response message 106 to provide information associated with the read request message 104. As another example, the DS processing 34 of the user device 12 (e.g., the requester) generates a request and outputs the request to the DSN interface 32 of the user device 12. The DSN interface 32 of the user device 12 transforms the request to produce and send the request message 104 to the DS unit 36 (e.g., the responder). The computing core 26 of the DS unit 36 generates a response and outputs the response to the DSN interface 32 of the DS unit 36. The DSN interface 32 of the DS unit 36 transforms the response to produce and send the response message 106 to the user device 12.

Requester and responder roles may change when a request/response message pair is initiated by another unit of the system. For example, DS unit 36 (e.g., the requester) generates and sends the request message 108 to the user device 12 (e.g., the responder). The user device 12 generates and sends the response message 110 to the DS unit 36 in response to receiving the request message 108. Such request/response message pairs may be utilized by any module or unit of the system. The request messages 104, 108 may be sent by one requester to one or more responders such that the same request message 104, 108 is sent to two or more responders when a plurality of responders is selected. A selection of a plurality of responders is discussed in greater detail with reference to FIG. 6C.

FIG. 6B is a diagram of an embodiment of a message format for a dispersed storage network (DSN) frame. A DSN frame may be utilized to communicate a request message and a response message 102. The DSN frame includes a protocol header 112. Alternatively, the DSN frame includes the protocol header 112 and a payload 114. A protocol header 112 includes information to request action and/or provide status. A payload 114 includes M payload bytes of supplemental information utilized in further action or in a response related to the information in the protocol header 112.

The protocol header 112 includes one or more of a protocol class field 116, a protocol class version field 118, an operation code field 120, a request/response field 122, a request number field 124, and a payload length field 126. A protocol class field 116 contains any number of bytes to specify a sub-protocol identifier to enable a plurality of families of protocols to be utilized. For example, the protocol class field 116 is one byte in length and includes a protocol class value of 01 hex to signify a first protocol class. The protocol class version field 118 contains any number of bytes to specify a sub-protocol version associated with the protocol class 116 enabling a plurality of versions of protocols to be utilized with each protocol class. For example, the protocol class version field is one byte in length and includes a protocol class version value of 01 hex to signify a first protocol class version.

The operation code field 120 contains any number of bytes to specify an operation code associated with a requested action providing message interpretation instructions to a message target. For example, the operation code field is one byte in length and includes an operation code value of a read operation. The request/response field 122 contains any number of bytes to specify whether the message is a request message or a response message. For example, the request/response field 122 is one byte in length and a response/reserve value is indicated by a one bit flag of the byte (e.g., a most significant bit of the byte). In an instance, a flag value of the one bit flag is zero when the message is a request message. In another instance, the flag value of the one bit flag is one when the message is a response message.

The request number field 124 contains any number of bytes to include request number value to associate at least one request message with at least one response message. A request number value may be produced as at least one of a random number, a random number plus a predetermined number, and based on a previous request number. For example, the request number field 124 is four bytes in length and includes a request number value of 457 to associate a read request message with a read response message when the previous request number value is 456. As another example, the request number field 124 includes a request number value of 5,358 to associate a read response message with a read request message when a request number value of 5,358 is extracted from the read request message.

The payload length field 126 contains any number of bytes to include a payload length value to indicate a number of bytes contained in the payload 114. A payload length value may be determined based on one or more of counting bytes of the payload 114, utilizing a predetermined number based on one or more of the protocol class value, the protocol class version value, the operation code value, and the response/reserved value, and utilizing a predetermined formula based on one or more of the protocol class value, the protocol class version value, the operation code value, and the response/reserved value. For example, the payload length field 126 is four bytes in length and includes a payload length value of zero when the operation code value is associated with a write rollback response operation and the response/reserved value is associated with a response message. As another example, the payload length field 126 includes a payload length value of 104 when the operation code value is associated with a read request message and a predetermined formula of 48n+8 associated with the read request message is utilized (e.g., where n=2 corresponding to 2 slice names).

The payload 114 may be organized into one or more payload fields in accordance with one or more of the values of the protocol class field 116, protocol class version field 118, the operation code field 120, and the request/response field 122. The one or more payload fields include payload bytes 0-M, wherein values of the payload bytes 0-M are establishing accordance with the one or more payload fields. For example, the one or more payload fields include slice name fields when the payload 114 is associated with a read request DSN frame. As another example, the one or more payload fields include one or more encoded data slices when the payload 114 is associated with a read response DSN frame. The method to generate the fields of the DSN frame and to generate values for the fields is discussed in greater detail with reference to FIGS. 6D-17B.

Figure 6C:
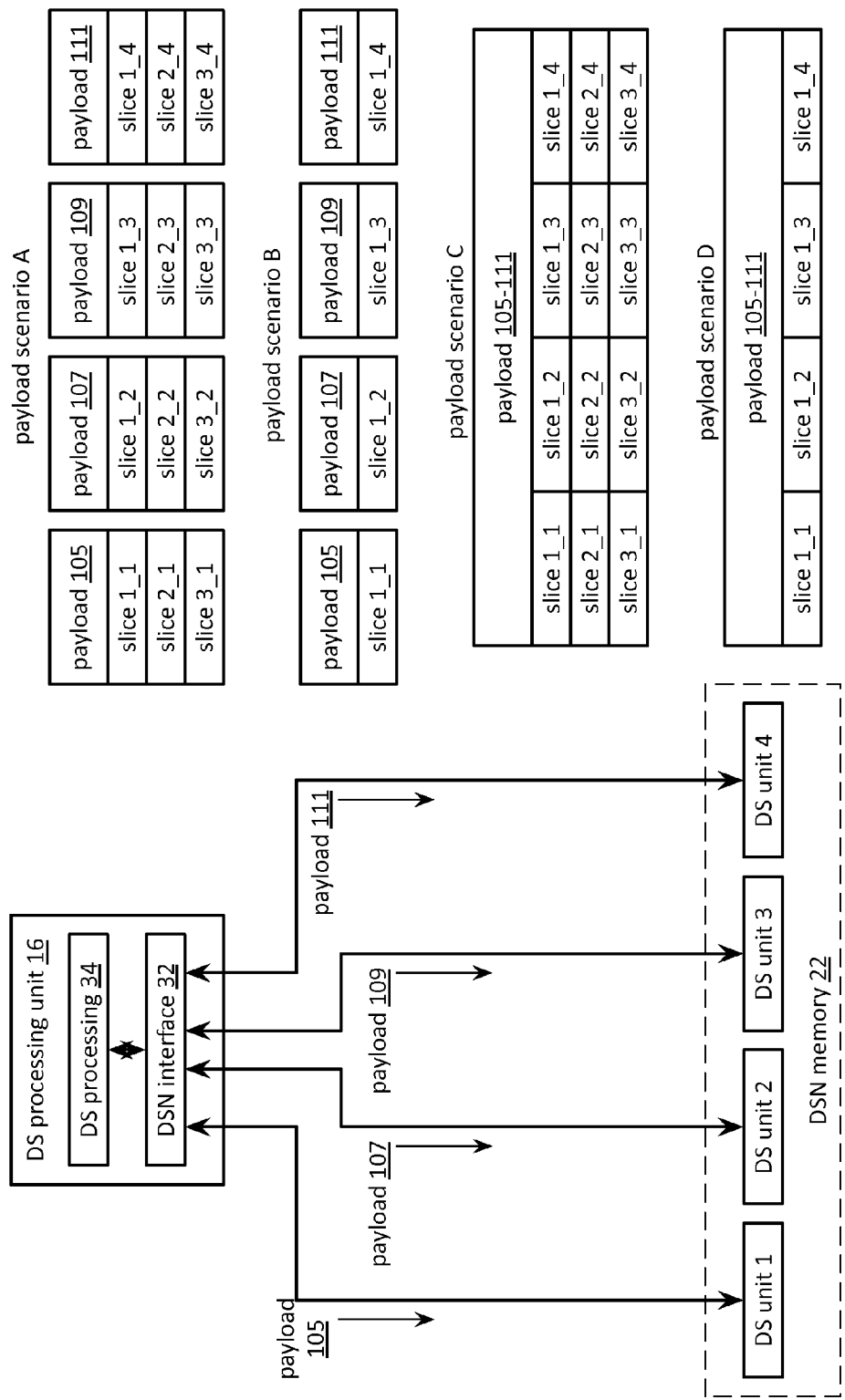
FIG. 6C is a schematic block diagram of another embodiment of a computing system in accordance with the invention.

FIG. 6C is a schematic block diagram of another embodiment of a computing system that includes a dispersed storage (DS) processing unit 16, a dispersed storage network (DSN) memory 22, and payload scenarios A-D. A DS processing unit 16 includes a DS processing 34 and a DSN interface 32. A DSN memory 22 includes DS units 1-4 when dispersed storage error coding parameters include a pillar width of 4. The DS processing unit 16 generates one or more request DSN frames wherein each DSN frame includes a payload. The DS processing unit 16 sends the one or more request DSN frames to DS units 1-4. The DS processing unit 16 sends a DSN frame to DS unit 1 that includes a payload 105, sends a DSN frame to DS unit 2 that includes a payload 107, sends a DSN frame to DS unit 3 that includes a payload 107, and sends a DSN frame to DS unit 4 that includes a payload 111. Each payload of the payloads 105-111 may be unique or maybe the same. For example, the DS processing unit 16 produces a plurality of encoded data slices, generates one or more write request messages that include the plurality of encoded data slices within one or more write request DSN frames, and sends the one or more write request DSN frames to the DSN memory 22 to facilitate storing the plurality of encoded data slices in the DS units 1-4.

In an example of operation, the DS processing 34 dispersed storage error encodes data utilizing the dispersed storage error coding parameters to produce 3 sets of encoded data slices 1_1 through 3_4 (e.g., set one includes slices 1-1 through 1_4). The DS processing 34 outputs a write request that includes the three sets of encoded data slices to the DSN interface 32. The DSN interface 32 generates at least one write request DSN frame wherein at least one payload section of the at least one write request DSN frame includes at least one encoded data slice of the three sets of encoded data slices. The DSN interface 32 sends the at least one write request DSN frame to the DS units 1-4 wherein the at least one write request DSN frame sent to DS unit 1 includes payload 105, the at least one write request DSN frame sent to DS unit 2 includes payload 107, the at least one write request DSN frame sent to DS unit 3 includes payload 109, and the at least one write request DSN frame sent to DS unit 4 includes payload 111.

The DSN interface 32 selects at least one encoded data slice of the three sets of encoded data slices to include in each of the payloads 105-111. The DSN interface 32 may select at least one of all slices of a corresponding pillar of the three sets of encoded data slices per payload (e.g., pillar one slices are included in the payload 105), one slice of the corresponding pillar of the three sets of encoded data slices per payload (e.g., one slice of pillar 2 is included in payload 107), all encoded data slices of the three sets of encoded data slices for all payloads 105-111, and one set (e.g., from one data segment) of encoded data slices of the three sets of encoded data slices for all payloads 105-111.

The payload scenarios A-D represent example scenarios indicating which encoded data slices of the three sets of encoded data slices are included in the payloads 105-107. Payload scenario A represents a scenario where the DSN interface 32 selects all slices of the corresponding pillar of the three sets of encoded data slices per payload. For example, the DSN interface 32 selects slices 1_1, 2_1, and 3_1 of pillar 1 to be included in payload 105, slices 1_2, 2_2, and 3_2 of pillar 2 to be included in payload 107, slices 1_3, 2_3, and 3_3 of pillar 3 to be included in payload 109, and slices 1_4, 2_4, and 3_4 of pillar 4 to be included in payload 111. Payload scenario B represents a scenario where the DSN interface 32 selects one slice of the corresponding pillar of the three sets of encoded data slices per payload. For example, the DSN interface 32 selects slice 1_1 of pillar 1 to be included in payload 105, slice 1_2 of pillar 2 to be included in payload 107, slice 1_3 of pillar 3 to be included in payload 109, and slice 1_4 of pillar 4 to be included in payload 111.

Payload scenario C represents a scenario where the DSN interface 32 selects all encoded data slices of the three sets of encoded data slices for all payloads 105-111. For example, the DSN interface 32 selects slices 1_1, 1_2, 1_3, 1_4, 2_1, 2_2, 2_3, 2_4, 3_1, 3_2, 3_3, and 3_4 to be included in each payload of payloads 105-111. Payload scenario D represents a scenario where the DSN interface 32 selects one of encoded data slices of the three sets of encoded data slices for all payloads 105-111. For example, the DSN interface 32 selects slices 1_1, 1_2, 1_3, and 1_4 to be included in each payload of payloads 105-111.

Figure 6D:
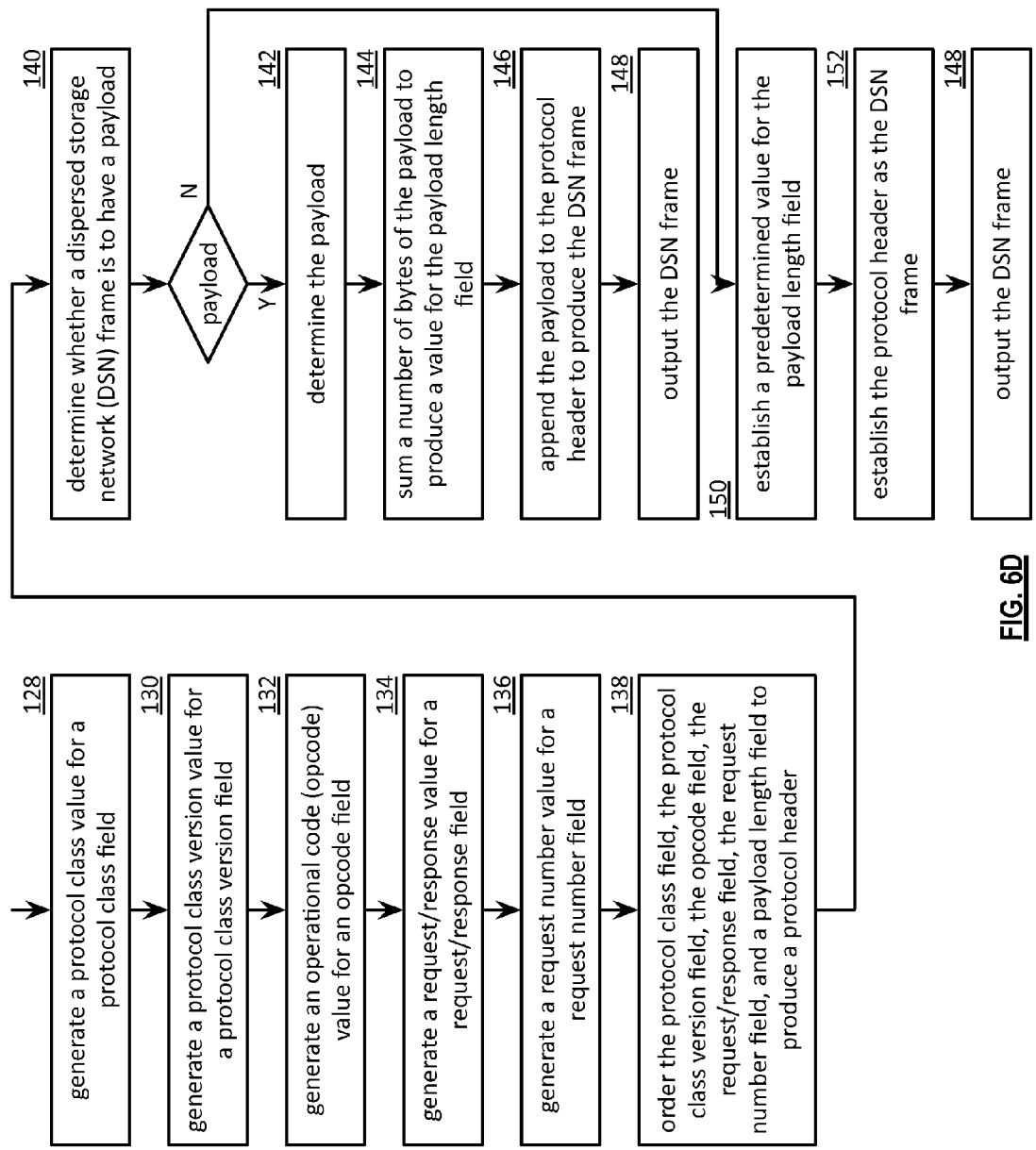
FIG. 6D is a flowchart illustrating an example of generating a protocol header of a dispersed storage network (DSN) frame in accordance with the invention.

FIG. 6D is a flowchart illustrating an example of generating a protocol header of a dispersed storage network (DSN) frame. The method begins with step 128 where a processing module generates values for a protocol class field, a protocol class version field, and an operation code (opcode) field based on an operational function being communicated by the DSN frame. An operational function includes at least one of a read operation, a check operation, a list range operation, a write operation, a checked write operation, a commit operation, a rollback operation, a finalize operation, an undo operation, and a list digest operation.

The processing module generates a protocol class value of the values for the protocol class field by at least one of retrieving the protocol class value from a protocol class list based on the operational function, utilizing the protocol class value of a request DSN frame (e.g., a DSN frame that includes a request message) when the DSN frame is a response DSN frame (e.g., a DSN frame that includes a response message), retrieving the protocol class value from a support protocol class list, retrieving the protocol class value from a unit-module type protocol class list, and extracting the protocol class value from a negotiation result. For example, the processing module generates a protocol class value of 01 when the protocol class value of a corresponding read request DSN frame has value of 01 and the operational function is a read response.

The method continues at step 130 where the processing module generates a protocol class version field. The processing module generates a protocol class version value of the values for the protocol class version field by at least one of utilizing a most recent protocol class version value, retrieving the protocol class version value from a protocol class version list based on the operational function, utilizing the protocol class version value of a request DSN frame when the DSN frame is a response DSN frame, retrieving the protocol class version value from a support protocol class version list, retrieving the protocol class version value from a unit-module protocol class version list, and extracting the protocol class version value from a negotiation result. For example, the processing module generates a protocol class version value of 03 based on retrieving the most recent protocol class version value from the support protocol class version list. As another example, processing module initiates a negotiation sequence when a protocol class error message is received (e.g., indicating that a present protocol class value and/or a present protocol class version value is unacceptable). A negotiation sequence includes one or more of generating a supported protocol class message, outputting the supported protocol class message, receiving a message that includes a supported protocol class list indicating supported protocol classes and/or protocol class versions, selecting at least one of a supported protocol class value and a protocol class version value from the supported protocol class list, and utilizing the at least one of the supported protocol class value and the supported protocol class version value.

The method continues at step 132 where the processing module generates an operation code field that includes an opcode value based on one or more of an operational function being communicated by the DSN frame, an opcode list, and a predetermination. For example, the processing module generates the operation code field to include an opcode value of 40 hex when the operational function being communicated by the DSN frame is a read request operation, the protocol class field value is 01, and the protocol class version field value is 03.

The method continues at step 134 where the processing module generates a request/response field to indicate a request message for a request message DSN frame or a response message for a response message DSN frame. For example, processing module generates the request/response field to include a value of zero when the DSN frame is the request message DSN frame. As another example, the processing module generates the request/response field to include a value of one when the DSN frame is the response message DSN frame. The method continues at step 136 where the processing module generates a request number field that includes a request number value by at least one of transforming a random number generator output to produce the value, transforming a variable reference number to produce the value (e.g., a hash or block cipher encryption of the variable reference number which increments by one for each new request number value), adding an increment to a previous request number value to produce the value, selecting a predetermined number to produce the value, and utilizing a request number value of a request DSN frame when the DSN frame is a response DSN frame. For example, the processing module generates a request number value of 39,239 in a four byte wide request number field based on the random number generator output. As another example, the processing module generates a request number value of 9,093 when the previous request number value is 9,083 and the increment is 10. As yet another example, the processing module generates a request number value of 277 when the request number value of the request DSN frame is 277 and the DSN frame is a response DSN frame.

The method continues at step 138 where the processing module arranges, in order, the protocol class field, the protocol class version field, the opcode field, the request/response field, the request number field, and a payload length field to produce the protocol header. The method continues at step 140 where the processing module determines whether the DSN frame is to have a payload based on one or more values of one or more of the fields of the protocol header. For example, the processing module determines that the DSN frame is not to have the payload when the opcode value indicates a write commit response operation. As another example, the processing module determines that the DSN frame is to have the payload when the opcode value indicates a read request operation. The method branches to step 151 when the processing module determines that the DSN frame is not to have the payload. The method continues to step 142 when the processing module determines that the DSN frame is to have the payload.

The method continues at step 142 where the processing module determines the payload as one of a request payload for a request message DSN frame and a response payload for a response message DSN frame. A determination may be based on one or more of the operational function, the values for the protocol class field, the protocol class version field, the request/response field, and the opcode field. The method to determine the payload is discussed in greater detail with reference to FIGS. 7A-17B.

The method continues at step 144 where the processing module sums a number of bytes of the payload to produce a value for the payload length field. Alternatively, the processing module determines the value utilizing one or more of a payload length formula and a fixed value. A determination may be based on one or more of the operational function, the values for the protocol class field, the protocol class version field, the request/response field, and the opcode field. For example, the processing module determines to utilize a payload length formula of 8T to produce the value as a four byte payload length field, where T is the number of transaction numbers, when the operational function is a write commit request operation. As another example, the processing module determines to utilize a fixed value of zero when the operational function is an undo write response operation. As yet another example, the processing module determines to sum number of bytes of the payload to produce the value as a four byte payload length field when the operational function is a checked write request operation.

The method continues at step 146 where the processing module appends the request payload to the protocol header to produce the request message DSN frame for a request message DSN frame or the processing module appends the response payload to the protocol header to produce the response message DSN frame for a response message DSN frame. The method continues at step 148 where the processing module outputs the DSN frame. For example, the processing module sends the request message DSN frame when the operational function is a write request operation. As another example, the processing module sends the response message DSN frame when the operational function is a write response operation.

The method continues at step 150 where the processing module establishes a value for the payload length field as a predetermined value. For example, processing module establishes the value as zero for the payload field when the DSN frame is not to have a payload. The method continues at step 152 where the processing module establishes the protocol header as the DSN frame. The method continues at step 148 where the processing module outputs the DSN frame.

Figure 7B:
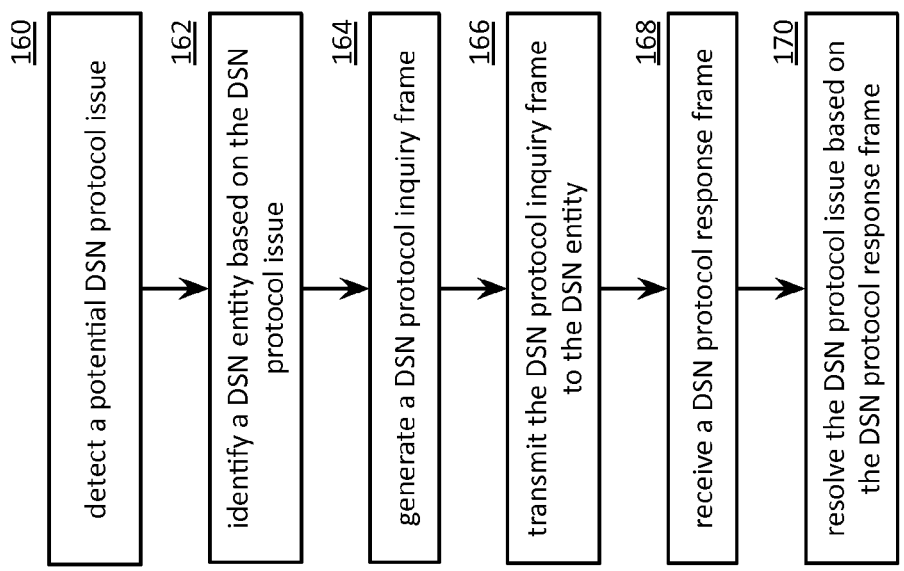
FIG. 7B is a flowchart illustrating an example of resolving a dispersed storage network (DSN) protocol issue in accordance with the invention.
Figure 7A:
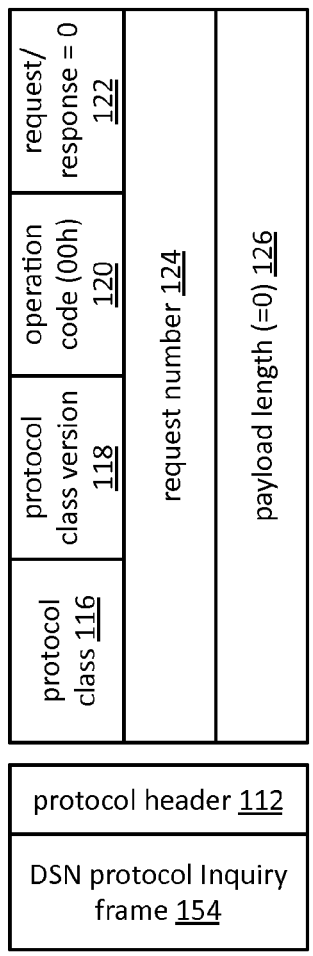
FIG. 7A is a diagram illustrating an example of a dispersed storage network (DSN) protocol inquiry frame format in accordance with the invention.

FIG. 7A is a diagram illustrating an example of a dispersed storage network (DSN) protocol inquiry frame format. A DSN protocol inquiry frame 154 may be associated with resolving a DSN protocol issue, wherein the DSN protocol inquiry frame 154 is sent to a DSN entity associated with the DSN protocol issue. A DSN protocol inquiry frame 154 includes a protocol header 112. A protocol header 112 includes one or more of a protocol class field 116, a protocol class version field 118, an operation code field 120, a request/response field 122, a request number field 124, and a payload length field 126. For example, the operation code field 120 includes an operation code value of 00 hex, the request/response field 122 includes a value of 0 (e.g., to signify a request/inquiry), and the payload length field 126 includes a value of 0 (e.g. no payload). The method to generate and utilize the DSN protocol inquiry frame 154 is described in greater detail with reference to FIG. 7B.

FIG. 7B is a flowchart illustrating an example of resolving a dispersed storage network (DSN) protocol issue. The method begins with step 160 where a processing module detects a potential DSN protocol issue that effects access of dispersed storage error encoded data within a DSN. Such detecting the potential DSN protocol issue includes one or more of detecting a new DSN entity of the DSN, detecting a boot up sequence, receiving a communication failure message, receiving an error message (e.g., an unsupported protocol error), detecting and addressing a decode issue, and detecting a system level operation for a general protocol inquiry of a DSN entity (e.g., any DSN entity activity). A DSN entity includes one of a dispersed storage (DS) unit, a DS processing module, a DS managing module, a DS rebuilding module, and a user device. For example, the processing module detects the potential DSN protocol issue when the processing module detects a new DSN entity (e.g., a recently added element of the DSN system) with no record of protocols supported by the new DSN entity.

Such detecting and addressing the decode issue includes detecting a decode threshold failure regarding a read function of the dispersed storage error encoded data, identifying a set of dispersed storage (DS) units of the DSN, wherein a DS unit of the sets of DS units stores an encoded data slice of the dispersed storage error encoded data and wherein the DSN entity is one of the set of DS units, generating a set of DSN protocol inquiry frames that include the DSN protocol inquiry frame, transmitting the set of DSN protocol inquiry frames to the set of DS units, receiving DSN protocol response frames from at least some of the set of DS units and resolving the DSN protocol issue based on the DSN protocol response frames.

The method continues at step 162 where the processing module identifies a DSN entity based on the DSN protocol issue (e.g., associated or affected by the DSN protocol issue). The method continues at step 164 where the processing module generates a DSN protocol inquiry frame. Such generating of the DSN protocol inquiry frame includes at least one of generating an operation code field to indicate the protocol discovery request operation (e.g., operation code 00h), generating a request number field to include a request number associated with the protocol discovery request operation, generating a protocol class field to indicate a protocol class for the protocol discovery request operation, generating a protocol class version field for the protocol discovery request operation, generating a payload length field of the protocol header to include a predetermined payload length value (e.g., 0), and generating a request/response field to indicate a request message (e.g., 0).

The method continues at step 166 where the processing module transmits the DSN protocol inquiry frame to the DSN entity. The method continues at step 168 where the processing module receives a DSN protocol response frame from the DSN entity. A DSN protocol response frame is discussed in greater detail with reference to FIG. 8A. The method continues at step 170 where the processing module resolves the DSN protocol issue based on the DSN protocol response frame. Such resolving of the DSN protocol issue includes comparing a protocol information received via the DSN protocol response frame with a known protocol information to identify a common protocol and common protocol version, generating a protocol selection frame that identifies the common protocol and the common protocol version, and transmitting the protocol selection frame to the DSN entity.

Figure 8B:
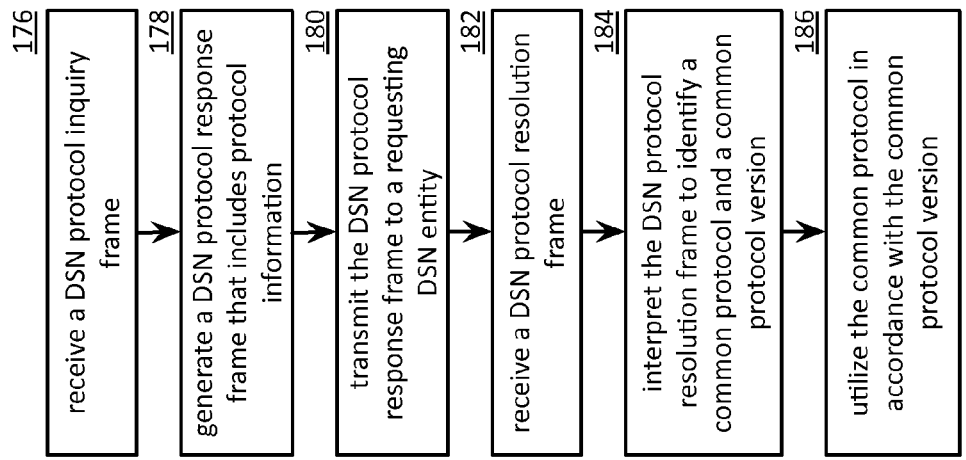
FIG. 8B is a flowchart illustrating another example of resolving a dispersed storage network (DSN) protocol issue in accordance with the invention.
Figure 8A:
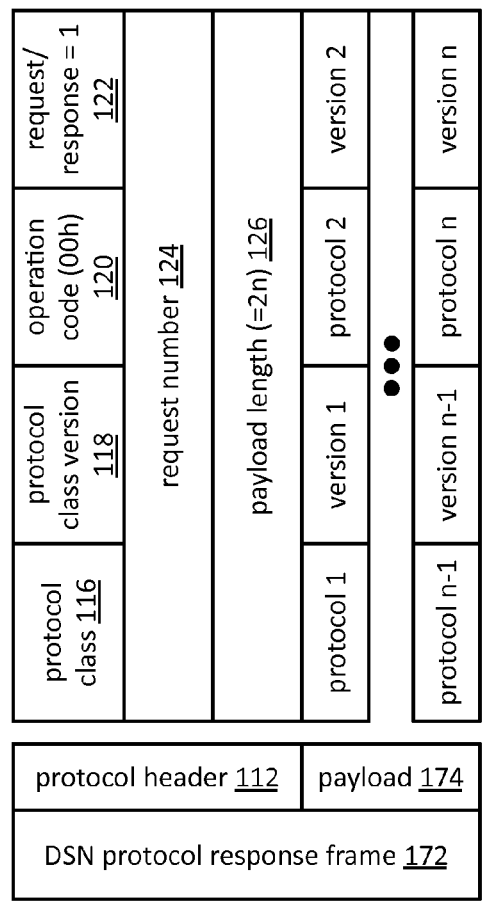
FIG. 8A is a diagram illustrating an example of a dispersed storage network (DSN) protocol response frame format in accordance with the invention.

FIG. 8A is a diagram illustrating an example of dispersed storage network (DSN) protocol response frame format. A DSN protocol response frame 172 may be associated with resolving a DSN protocol issue, wherein the DSN protocol response frame 172 is sent in response to receiving a DSN protocol inquiry frame. A DSN protocol response frame 172 includes a protocol header 112 and a payload 174. A protocol header 112 includes one or more of a protocol class field 116, a protocol class version field 118, an operation code field 120, a request/response field 122, a request number field 124, and a payload length field 126. For example, the operation code field 120 includes an operation code value of 00 hex, the request/response field 122 includes a value of 1 (e.g., to signify a response), and the payload length field 126 includes a value representing the number of bytes of the payload 174. The method to generate and utilize the DSN protocol response frame 172 is described in greater detail with reference to FIG. 8B.

A payload 174 includes n pairs of supported associated protocol identifiers and version identifiers. As such, the payload length 126 includes a value of 2n when each protocol identifier and each version identifier are one byte each. A protocol identifier 1-n identifies a supported protocol of one or more protocols. A version identifier 1-n identifies a version of the supported protocol. A protocol may be associated with a plurality of versions. For example, protocol field 1 includes protocol XYZ, version field 1 includes version a, protocol field 2 includes protocol XYZ, version field 2 includes version b, protocol field 3 includes protocol XYZ, version field 3 includes version c, when versions a-c of protocol XYZ are supported.

In an example of operation, a DSN protocol inquiry is received and a DSN protocol response frame 174 is generated that includes protocol information. The DSN protocol response frame 174 is transmitted and a DSN protocol resolution frame is received. The DSN protocol resolution frame is interpreted to identify a common protocol and a common protocol version (e.g., common with other entities of a DSN). Next, the common protocol is utilized in accordance with the common protocol version. A method of operation is discussed in greater detail with reference to FIG. 8B.

FIG. 8B is a flowchart illustrating another example of resolving a dispersed storage network (DSN) protocol issue. The method begins at step 176 where a processing module receives a dispersed storage network (DSN) protocol inquiry frame regarding a potential DSN protocol issue that effects access of dispersed storage error encoded data within a DSN. The method continues at step 178 where the processing module generates a DSN protocol response frame that includes protocol information. Such generating of the DSN protocol response frame includes generating a payload and a header. Such generating the payload includes generating the payload to include one or more protocol fields and one or more corresponding version fields, wherein a protocol field of the one or more protocol fields indicates a supported protocol and a corresponding version field of the one or more corresponding version fields indicates a version of the supported protocol. For example, the processing module generates the protocol information (e.g., the one or more protocol fields in the one or more corresponding version fields) based on a protocol table lookup.

Such generating the header includes generating the header by at least one of generating a payload length field of the protocol header to include a payload length that represents a length of the one or more protocol fields and the one or more corresponding version fields, generating a request number field to include a request number associated with a protocol discovery request operation (e.g., copy from corresponding request), generating a protocol class field to indicate a protocol class for the protocol discovery response operation, generating a protocol class version field for the protocol discovery response operation, generating an operation code field to indicate the protocol discovery response operation (e.g., operation code 00h), and generating a request/response field to indicate a response message (e.g., 1).

The method continues at step 180 where the processing module transmits the DSN protocol response frame to a requesting DSN entity (e.g., requesting DSN entity associated with the DSN protocol inquiry frame). The method continues at step 182 where the processing module receives a DSN protocol resolution frame from the requesting DSN entity, wherein the DSN protocol resolution frame includes information regarding resolving the DSN protocol issue. The method continues at step 184 where the processing module interprets the DSN protocol resolution frame to identify a common protocol and a common protocol version. For example, the processing module interprets protocol X1 as the common protocol when protocol X1 is included in the DSN protocol resolution frame and is included in a local supported protocol list. The method continues at step 186 where the processing module utilizes the common protocol in accordance with the common protocol version for access requests regarding the dispersed storage error encoded data (e.g., in association with communications between processing module and at least one other DSN entity).

FIG. 9A is a diagram illustrating an example of a null operation request message format of a null operation request message 188. A null operation request message 188 includes a protocol header 112. A protocol header 112 includes one or more of a protocol class field 116, a protocol class version field 118, an operation code field 120, a request/response field 122, a request number field 124, and a payload length field 126. For example, the operation code field 120 includes an operation code value of 01 hex, the request/response field 122 includes a value of 0 (e.g., to signify a request/inquiry), and the payload length field 126 includes a value of 0 (e.g. no payload) when the protocol header 112 is included in the null operation request message 188. The method to generate and utilize the null operation request message 188 is described in greater detail with reference to FIG. 9B.

In an example of operation, a determination is made to generate and send the null operation request message 188 based on one or more of a performance measurement requirement, a communication link integrity verification requirement, and a communication link activity requirement. For example, the determination is made to generate the null operation request message 188 to measure a round trip latency time between at least two elements of a dispersed storage network (DSN) when the performance measurement requirement indicates that a measurement is required. As another example, the null operation request message 188 is generated to verify a communication link to another element of the DSN when the communication link integrity verification requirement indicates that a verification is required. As yet another example, the null operation request message 188 is generated to maintain a minimum level of communication link activity with the other elements of the DSN when the communication link activity requirement indicates that an activity level is required. The null operation request message 188 is generated in accordance with the null operation request message format. The null operation request message 188 is sent to the other element of the DSN. The other element receives the null operation request message 188 and generates a null operation response message. The other element sends the null operation response message back to the sender of the null operation request message 188. The sender of the null operation request message 188 receives the null operation response message and processes the response message further. Such processing of the ball operation response message includes one or more of calculating a round-trip performance time, determining whether a communication link is functioning properly, and a null operation (e.g., to ignore the response).

FIG. 9B is a flowchart illustrating an example of generating a null operation request message by a processing module, which include similar steps to FIG. 6D. The method begins with step 190 where a processing module generates a protocol class and a protocol class version based on one or more of a default list for new system elements, a supported protocol indicator, information received in a previous message, a list, a predetermination, a command, and a protocol table lookup when the processing module determines to generate and send the null operation request message. For example, the processing module may generate the protocol class and protocol class version as 01 hex when the processing module determines that there is only one supported protocol class and one supported protocol class version as indicated by a table lookup.

The method continues at step 192 where the processing module generates an operation code and a response flag based on one or more of the protocol class, the protocol class version, information received in a previous message, a list, a task identifier, a predetermination, a command, and a table lookup. For example, the processing module generates the operation code as 01 hex when the processing module receives a command to execute a null operation request sequence. At step 192, the processing module generates the response flag as zero when the processing module determines that this message is a request message based on the command. The method continues at step 136 of FIG. 6D where the processing module generates a request number.

The method continues at step 196 where the processing module determines a payload length based on one or more of an opcode to payload length lookup table, the opcode, a calculation, the number of bytes in the payload if any, a formula, a predetermination, a message, and a command. For example, the processing module determines the payload length to be zero when the processing module looks up a payload length in the opcode to payload length lookup table based on the current opcode. As another example, the processing module calculates the payload length to be zero by counting the number of bytes of the payload (e.g., zero since no payload).

The method continues at step 198 where the processing module populates the request message protocol header and payload, if any, to produce the null operation request message in accordance with the null operation request message format. The method continues at step 200 where the processing module sends the null operation request message to a target system element. The target system element receives the null operation request message and forms a null operation response message. The target system element sends the null operation response message to the processing module. The processing module receives the null operation response message and processes the response message. The format of the null operation response message is discussed in greater detail with reference to FIG. 10A. The method of operation of generating and sending the null operation response message is discussed in greater detail with reference to FIG. 10B.

FIG. 10A is a diagram illustrating an example of a null operation response message format of a null operation response message 202. A null operation response message 202 includes a protocol header 112. A protocol header 112 includes one or more of a protocol class field 116, a protocol class version field 118, an operation code field 120, a request/response field 122, a request number field 124, and a payload length field 126. For example, the operation code field 120 includes an operation code value of 01 hex, the request/response field 122 includes a value of 1 (e.g., to signify a response), and the payload length field 126 includes a value of 0 (e.g. no payload) when the protocol header 112 is included in the null operation response message 202. The method to generate and utilize the null operation response message 202 is described in greater detail with reference to FIG. 10B.

In an example of operation, a null operation response message is generated in accordance with the null operation response message format and sent to a requesting element of a dispersed storage network (DSN) when a null operation request message is received from the requesting element.

FIG. 10B is a flowchart illustrating an example of generating a null operation response message, which include similar steps to FIG. 6D. The method begins with step 204 where a processing module generates a protocol class and a protocol class version based on one or more of a default list for new system elements, a supported protocol indicator, information received in a previous message, a list, a predetermination, a command, and a protocol table lookup when the processing module determines to generate and send the null operation response message (e.g., based on receiving a null operation request message). For example, the processing module may generate the protocol class and protocol class version as 01 hex when the processing module determines that there is only one supported protocol class and one supported protocol class version as indicated by a table lookup.

The method continues at step 206 where the processing module generates an operation code and a response flag based on one or more of the protocol class, the protocol class version, information received in a previous message, a list, a task identifier, a predetermination, a command, and a table lookup. For example, the processing module generates the operation code as 01 hex when the processing module receives a command to execute a null operation response sequence. At step 206, the processing module generates the response flag as one when the processing module determines that this message is a response message based on the command. The method continues at step 136 of FIG. 6D where the processing module generates a request number (e.g., same as a request number from a corresponding null operation request message).

The method continues at step 210 where the processing module determines a payload length based on one or more of an opcode to payload length lookup table, the opcode, a calculation, the number of bytes in a payload if any, a formula, a predetermination, a message, and a command. For example, the processing module determines the payload length to be zero when the processing module looks up a payload length in the opcode to payload length lookup table based on the current opcode. As another example, the processing module calculates the payload length to be zero by counting the number of bytes of the payload (e.g., zero since no payload).

The method continues at step 212 where the processing module populates a response message protocol header and the payload, if any, to produce the null operation response message in accordance with the null operation response message format. The method continues at step 214 where the processing module sends the null operation response message to a requesting system element.

Figure 11B:
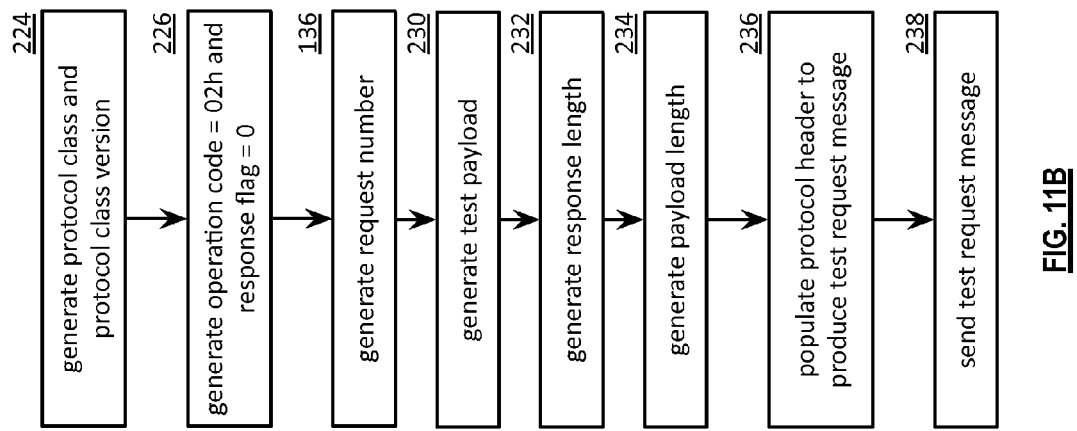
FIG. 11B is a diagram illustrating an example of a test request message in accordance with the invention.
Figure 11A:
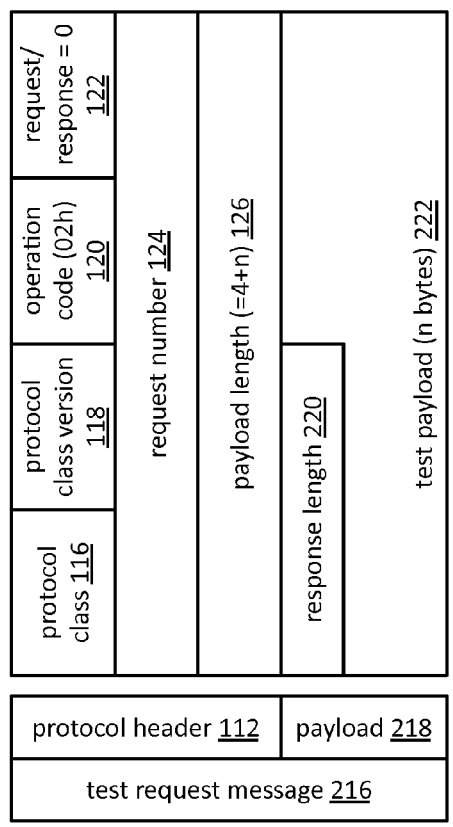
FIG. 11A is a diagram illustrating an example of a test request message format in accordance with the invention.

FIG. 11A is a diagram illustrating an example of a test request message format of a test request message 216. A test request message 216 includes a protocol header 112 and a payload 218. A protocol header 112 includes one or more of a protocol class field 116, a protocol class version field 118, an operation code field 120, a request/response field 122, a request number field 124, and a payload length field 126. For example, the operation code field 120 includes an operation code value of 02 hex, the request/response field 122 includes a value of 0 (e.g., to signify a request), and the payload length field 126 includes a value representing the number of bytes of the payload 218. The method to generate and utilize the test request message 216 is described in greater detail with reference to FIG. 11B.

A payload 218 includes a response length field 220 and a test payload field 222. A test payload field 222 includes test data to be utilized in a test. A test may include one or more of measuring a speed of data transfer, measuring a bandwidth of data transfer, measuring a latency of data transfer, and measuring an error rate of data transfer. As such, a volume of the test payload 222 may be relatively small for a test to measure a speed of data transfer and measuring latency of data transfer. A volume of the test payload 222 may be relatively large for tests of measuring bandwidth of data transfer and measuring error rate of data transfer. Such test data may include random data or determined data in accordance with a test data determination method. For example, determined test data includes predetermined text strings to enable error rate determination by comparing test payload data sent in the test request message to subsequently received test payload data from a test response message. A response length field 220 includes a requested value of a number of bytes of a response test payload.

In an example of operation, a determination is made to initiate a test sequence. A determination may be based on one or more of a communications error message, a test schedule, an error indicator, a performance indicator, a reliability indicator, a predetermination, a message, and a command. For example, a determination is made to initiate the test sequence when an above average number of communication errors have occurred within a time period. Next, test objectives and/or a test method is determined. For example, test objectives are determined based on an error rate of data transfer when communication errors have occurred.

A test method is determined to include sending a relatively large predetermined test payload to another element of a dispersed storage network (DSN) such that the other element will return a test payload. The test request message 216 is generated in accordance with the test request message format and sent to the other element of the DSN. The test request message 216 is received and a test response message is generated in accordance with a test response message format. The test response message is sent to a requesting entity. The test response message is received and processed in accordance with the test method to determine whether a test result is favorable. For example, a test payload of the test response message is compared with the test payload of the test request message 216 to determine an error rate of data transfer. The method to generate and send the test request message 216 is discussed in greater detail with reference to FIG. 11B. The format of the test response message is discussed in greater detail with reference to FIG. 12A. The method of operation to generate and send the test response message discussed in greater detail with reference to FIG. 12B.

FIG. 11B is a flowchart illustrating an example of generating a test request message, which include similar steps to FIG. 6D. The method begins with step 224 where a processing module generates a protocol class and a protocol class version based on one or more of a default list for new system elements, a supported protocol indicator, information received in a previous message, a list, a predetermination, a command, and a protocol table lookup when the processing module determines to generate and send the test request message. For example, the processing module may generate the protocol class and protocol class version as 01 hex when the processing module determines that there is only one supported protocol class and one supported protocol class version as indicated by a table lookup.

The method continues at step 226 where the processing module generates an operation code and a response flag based on one or more of the protocol class, the protocol class version, information received in a previous message, a list, a task identifier, a predetermination, a command, and a table lookup. For example, the processing module generates the operation code as 02 hex when the processing module receives a command to execute a test request sequence. At step 226, the processing module generates the response flag as zero when the processing module determines that this message is a request message based on the command. The method continues at step 136 of FIG. 6D where the processing module generates a request number.

The method continues at step 230 where the processing module generates a test payload in accordance with a test method. The method continues at step 232 where the processing module generates a response length in accordance with the test method. A response length constraints a length of a test payload of a corresponding test response message. For example, the processing module generates a relatively small response length when an expected test payload of the corresponding test response message is relatively small in accordance with the test method.

The method continues at step 234 where the processing module generates a payload length based on one or more of an opcode to payload length lookup table, the opcode, a calculation, the number of bytes in the payload, a formula, a predetermination, a message, and a command. For example, the processing module generates the payload length as a sum of the number of bytes of the test payload and the response length. In an instance, the processing module generates the payload length to be a size of the response length field (e.g., 4 bytes) plus the value of the test payload field (e.g. 10,000) for a total of 10,004 bytes.

The method continues at step 236 where the processing module populates the request message protocol header and payload, to produce the test request message in accordance with a test request message format. The method continues at step 238 where the processing module sends the test request message to a target system element. The target system element receives the test request message and generates a test response message. The target system element sends the test response message to the processing module. The processing module receives the test response message and processes the test response message. Such processing includes one or more of determining whether a test payload of the test response message compares favorably to an expected test value and determining whether a number of bytes of the test payload of the test response message compares favorably to the response length. The format of the test response message is discussed in greater detail with reference to FIG. 12A. The method of operation of generating and sending the test response message is discussed in greater detail with reference to FIG. 12B.

Figure 12B:
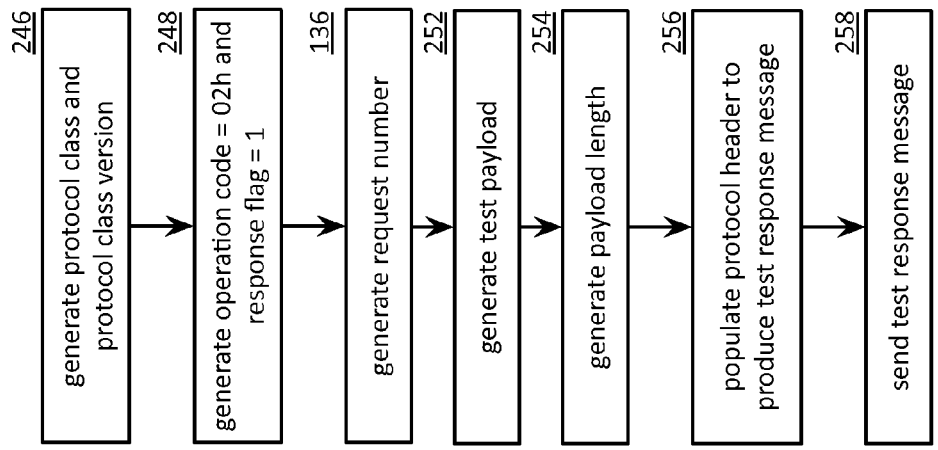
FIG. 12B is a flowchart illustrating an example of generating test response message in accordance with the invention.
Figure 12A:
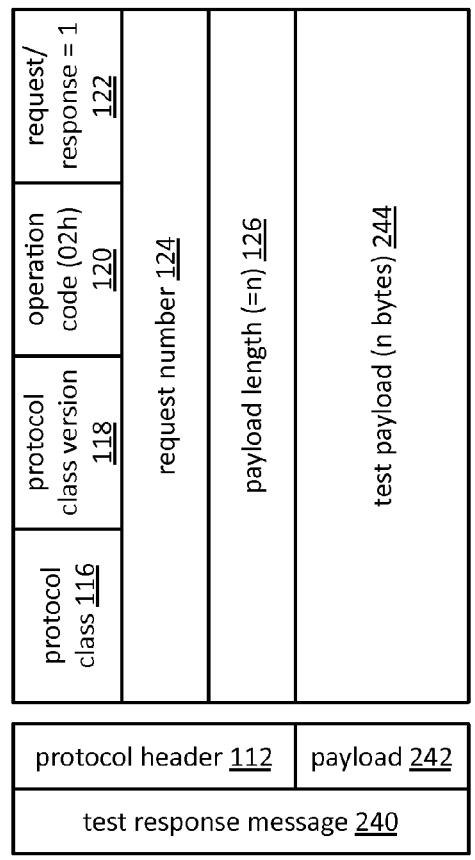
FIG. 12A is a diagram illustrating an example of a test response message format in accordance with the invention.

FIG. 12A is a diagram illustrating an example of a test response message format of a test response message 240. A test response message 240 includes a protocol header 112 and a payload 242. A protocol header 112 includes one or more of a protocol class field 116, a protocol class version field 118, an operation code field 120, a request/response field 122, a request number field 124, and a payload length field 126. For example, the operation code field 120 includes an operation code value of 02 hex, the request/response field 122 includes a value of 1 (e.g., to signify a response), and the payload length field 126 includes a value representing the number of bytes of the payload 242. The method to generate and utilize the test response message 240 is described in greater detail with reference to FIG. 12B.

A payload 242 includes a test payload field 244. A test payload field 244 includes test data of a test. Such test data includes at least one of random data and test data from a test payload field of a corresponding test request message. Such test data is generated in accordance with a response length value of the corresponding test request message. For example, a received test request message includes a response length value of 1000 bytes and no test data. As such, test data of the test payload field of the test response message 240 is generated to produce 1000 bytes of random testing. As another example, a received test request message includes a response length value of 10,000 bytes and 10,000 bytes of test data. As such, the test data of the test payload field of the test response message 240 is generated utilizing the 1000 bytes of test data from the received test request message. The method of operation to generate and send the test response message discussed in greater detail with reference to FIG. 12B.

FIG. 12B is a flowchart illustrating an example of generating a test response message by a processing module, which include similar steps to FIG. 6D. The method begins with step 246 where a processing module generates a protocol class and a protocol class version based on one or more of a default list for new system elements, a supported protocol indicator, information received in a previous message, a list, a predetermination, a command, and a protocol table lookup when the processing module determines to generate and send the test response message. For example, the processing module may generate the protocol class and protocol class version as 01 hex when the processing module determines that there is only one supported protocol class and one supported protocol class version as indicated by a table lookup.

The method continues at step 248 where the processing module generates an operation code and a response flag based on one or more of the protocol class, the protocol class version, information received in a previous message, a list, a task identifier, a predetermination, a command, and a table lookup. For example, the processing module generates the operation code as 02 hex when the processing module receives a command to execute a test response sequence. At step 248, the processing module generates the response flag as one when the processing module determines that this message is a response message based on the command. The method continues at step 136 of FIG. 6D where the processing module generates a request number (e.g., same as a request number of a corresponding test request message).

The method continues at step 252 where the processing module generates a test payload in accordance with a corresponding test request message. For example, the processing module generates n random bytes of test data when a test payload of a corresponding test request message is null and a response length of the corresponding test request message is n bytes. As another example, the processing module generates the test payload as the test payload of the corresponding test request message when the test payload of the corresponding test request message is not null.

The method continues at step 254 where the processing module generates a payload length based on one or more of an opcode to payload length lookup table, the opcode, a calculation, the number of bytes in the payload, a formula, a predetermination, a message, and a command. For example, the processing module generates the payload length the number of bytes of the test payload.

The method continues at step 256 where the processing module populates the request message protocol header and payload, to produce the test response message in accordance with a test response message format. The method continues at step 258 where the processing module sends the test response message to a test requesting entity.

Figure 13B:
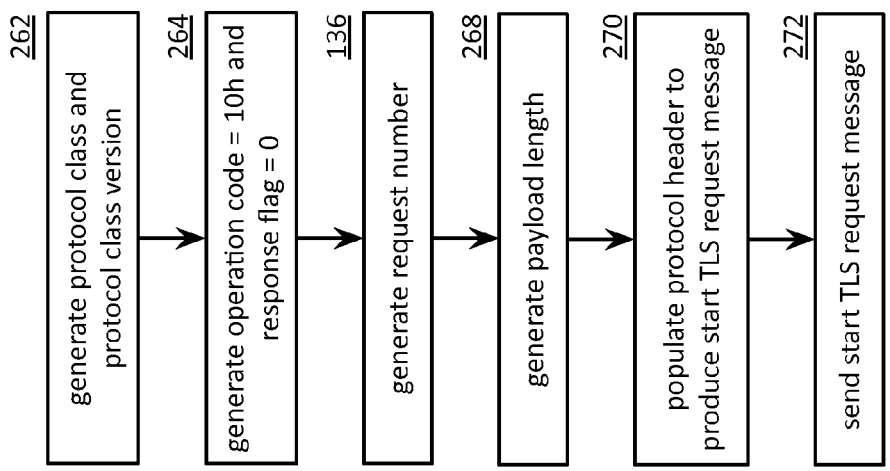
FIG. 13B is a flowchart illustrating an example of generating a start transport layer security (TLS) request message in accordance with the invention.
Figure 13A:
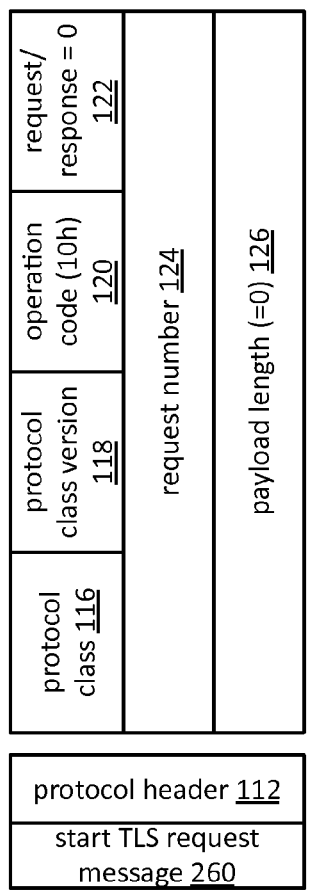
FIG. 13A is a diagram illustrating an example of a start transport layer security (TLS) request message format in accordance with the invention.

FIG. 13A is a diagram illustrating an example of a start transport layer security (TLS) request message format of a start TLS request message 260. A start TLS request message 260 includes a protocol header 112. A protocol header 112 includes one or more of a protocol class field 116, a protocol class version field 118, an operation code field 120, a request/response field 122, a request number field 124, and a payload length field 126. For example, the operation code field 120 includes an operation code value of 10 hex, the request/response field 122 includes a value of 0 (e.g., to signify a request), and the payload length field 126 includes a value of 0 (e.g. no payload) when the protocol header 112 is included in the start TLS request message 260. The method to generate and utilize the start TLS request message 260 is described in greater detail with reference to FIG. 13B.

In an example of operation, a determination is made to generate and send the start TLS request message 260 based on one or more of a security requirement, a communication link integrity requirement, an error message, an intrusion detection indicator, an encrypted connection request, a secure connection table entry, a message, and a command. For example, a determination is made to generate and send the start TLS request message 260 when a local application indicates that an encrypted connection is required between a processing module and another system element. As another example, the determination is made to generate and send the start TLS request message 260 when a secure communication connection is required with at least one other dispersed storage network (DSN) system element as indicated by the secure connection table lookup for the at least one other system element.

In the example of operation continued, the start TLS request message 260 is generated in accordance with the start TLS request message format and sent to the at least one other element of the DSN. The at least one other element receives the start TLS request message 260 and generates a start TLS response message in accordance with a start TLS response message format. The at least one other element sends the start TLS response message to the requesting entity. The start TLS response message is received and processed. Such processing of the start TLS response message includes one or more of activating an encrypted connection mode, retrieving security parameters, determining security parameters, testing the integrity of a communications link, notifying a requesting application that the security process has been initiated, generating a TLS handshake, and sending the TLS handshake. For example, a TLS handshake is generated and sent to the at least one other system element when the start TLS response message is received from the at least one other system element. The other system element receives the TLS handshake and sends a message back to the requesting entity indicating that the at least one other system element is ready to start accepting encrypted traffic. The message indicating that the at least one other system element is ready to start accepting encrypted traffic. Subsequent communications to the at least one other system element utilizes encrypted communications. The method to generate and send the start TLS request message 260 is discussed in greater detail with reference to FIG. 13B.

FIG. 13B is a flowchart illustrating an example of generating a start transport layer security (TLS) request message, which include similar steps to FIG. 6D. The method begins with step 262 where a processing module generates a protocol class and a protocol class version based on one or more of a default list for new system elements, a supported protocol indicator, information received in a previous message, a list, a predetermination, a command, and a protocol table lookup when the processing module determines to generate and send the start TLS request message. For example, the processing module generates the protocol class and protocol class version as 01 hex when the processing module determines that there is only one supported protocol class and one supported protocol class version as indicated by a table lookup.

The method continues at step 264 where the processing module generates an operation code and a response flag based on one or more of the protocol class, the protocol class version, information received in a previous message, a list, a task identifier, a predetermination, a command, and a table lookup. For example, the processing module generates the operation code as 10 hex when the processing module receives a command to execute a start TLS request sequence. At step 264, the processing module generates the response flag as zero when the processing module determines that this message is a request message based on the command. The method continues at step 136 of FIG. 6D where the processing module generates a request number.

The method continues at step 268 where the processing module determines a payload length based on one or more of an opcode to payload length lookup table, the opcode, a calculation, the number of bytes in the payload if any, a formula, a predetermination, a message, and a command. For example, the processing module determines the payload length to be zero when the processing module looks up a payload length in the opcode to payload length lookup table based on the current opcode. As another example, the processing module calculates the payload length to be zero by counting the number of bytes of the payload (e.g., zero since no payload).

The method continues at step 270 where the processing module populates the request message protocol header and payload, if any, to produce the null operation request message in accordance with the start TLS request message format. The method continues at step 272 where the processing module sends the start TLS request message to a target system element. The target system element receives the start TLS request message and forms a start TLS response message. The target system element sends the start TLS response message to the processing module. The processing module receives the start jealous response message and processes the response message. The format of the start jealous response message is discussed in greater detail with reference to FIG. 14A. The method of operation of generating and sending the start TLS response message is discussed in greater detail with reference to FIG. 14B.

FIG. 14A is a diagram illustrating an example of a start transport layer security (TLS) response message format of a start TLS response message 274. A start TLS response message 274 includes a protocol header 112. A protocol header 112 includes one or more of a protocol class field 116, a protocol class version field 118, an operation code field 120, a request/response field 122, a request number field 124, and a payload length field 126. For example, the operation code field 120 includes an operation code value of 10 hex, the request/response field 122 includes a value of 1 (e.g., to signify a response), and the payload length field 126 includes a value of 0 (e.g. no payload) when the protocol header 112 is included in the start TLS response message 274. The method to generate and utilize the start TLS response message 274 is described in greater detail with reference to FIG. 14B.

In an example of operation, a start TLS response message 274 is generated in accordance with the start jealous response message format and sent to a requesting element of a dispersed storage network (DSN) when a corresponding start TLS request message is received from the requesting element. In addition, the processing module may apply a secure sockets layer and/or a transport layer security filter to a connection with the requesting element.

FIG. 14B is a flowchart illustrating an example of generating a start transport layer security (TLS) response message, which include similar steps to FIG. 6D. The method begins with step 276 where a processing module generates a protocol class and a protocol class version based on one or more of a default list for new system elements, a supported protocol indicator, information received in a previous message, a list, a predetermination, a command, and a protocol table lookup when the processing module determines to generate and send the start TLS response message (e.g., based on receiving a start TLS request message and being equipped for secure operations). For example, the processing module may generate the protocol class and protocol class version as 01 hex when the processing module determines that there is only one supported protocol class and one supported protocol class version as indicated by a table lookup.

The method continues at step 278 where the processing module generates an operation code and a response flag based on one or more of the protocol class, the protocol class version, information received in a previous message, a list, a task identifier, a predetermination, a command, and a table lookup. For example, the processing module generates the operation code as 10 hex when the processing module receives a command to execute a start TLS response sequence. At step 278, the processing module generates the response flag as one when the processing module determines that this message is a response message based on the command. The method continues at step 136 of FIG. 6D where the processing module generates a request number (e.g., same as a request number from a corresponding start TLS request message).

The method continues at step 282 where the processing module determines a payload length based on one or more of an opcode to payload length lookup table, the opcode, a calculation, the number of bytes in a payload if any, a formula, a predetermination, a message, and a command. For example, the processing module determines the payload length to be zero when the processing module looks up a payload length in the opcode to payload length lookup table based on the current opcode. As another example, the processing module calculates the payload length to be zero by counting the number of bytes of the payload (e.g., zero since no payload).

The method continues at step 284 where the processing module populates a response message protocol header and the payload, if any, to produce the start TLS response message in accordance with a start TLS response message format. The method continues at step 286 where the processing module sends the start TLS response message to a requesting system element.

Figure 15B:
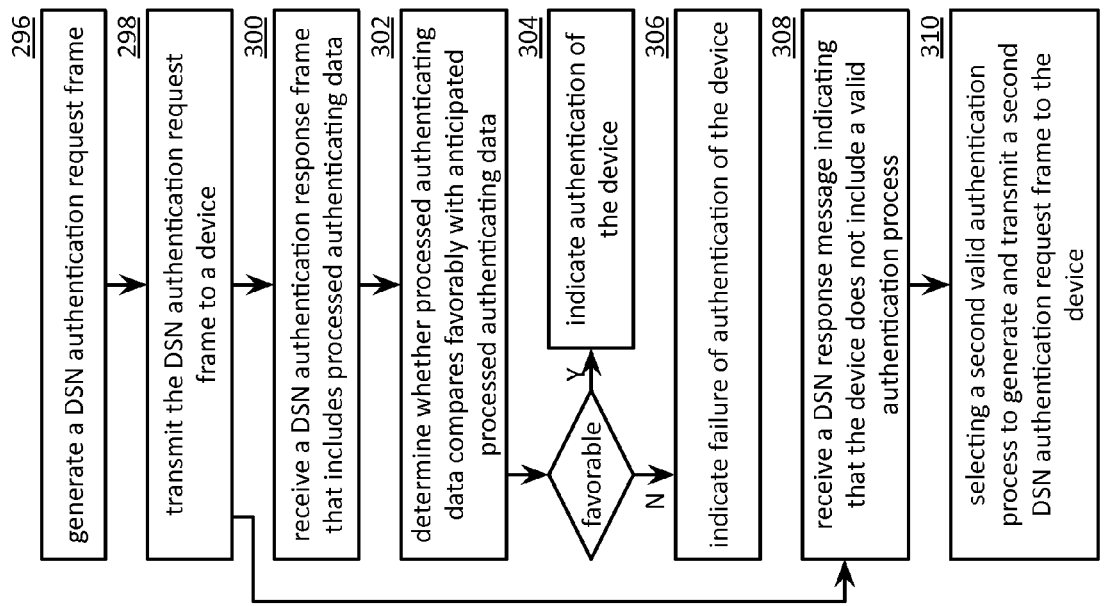
FIG. 15B is a flowchart illustrating an example of authenticating a device of a dispersed storage network (DSN) in accordance with the invention.
Figure 15A:
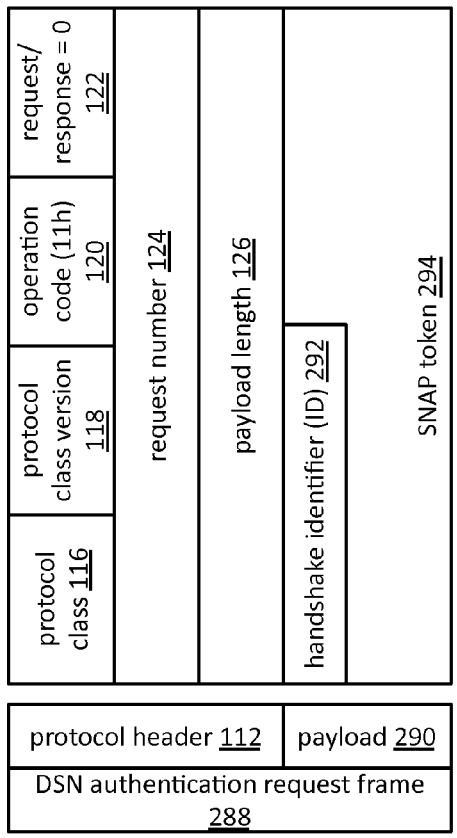
FIG. 15A is a diagram illustrating an example of a storage network authentication protocol (SNAP) request message format in accordance with the invention.

FIG. 15A is a diagram illustrating an example of a storage network authentication protocol (SNAP) request message format of a dispersed storage network (DSN) authentication request frame 288. A DSN authentication request frame 288 includes a protocol header 112 and a payload 290. A protocol header 112 includes one or more of a protocol class field 116, a protocol class version field 118, an operation code field 120, a request/response field 122, a request number field 124, and a payload length field 126. For example, the operation code field 120 includes an operation code value of 11 hex, the request/response field 122 includes a value of 0 (e.g., to signify a request), and the payload length field 126 includes a value representing the number of bytes of the payload 290.

The method to generate and utilize the DSN authentication request frame 288 is described in greater detail with reference to FIG. 15B.

A payload 290 includes a SNAP token field 294 and may include a handshake identifier (ID) field 292. A handshake ID field 292 includes an authenticating code (e.g., a mechanism name), wherein the authenticating code references a valid authenticating process. A valid authenticating process includes one or more authentication mechanisms including at least one of a deterministic algorithm, a stored data manipulation method, a received data manipulation method, a compression scheme, a checksum scheme, a signature function, a hashing function, and an encryption method. A handshake ID field 292 may be encoded utilizing distinguished encoding rules (DER) as an unsigned integer. As such, the handshake ID field 292 is variable in length. A SNAP token field 294 includes at least one of authenticating data and an authorization status. Authenticating data includes at least one of the authentication mechanisms and a field type indicator. A field type indicator indicates whether a first parameter is a string or an integer. An authorization status indicates at least one of mechanism accepted, mechanism rejected, and mechanism continuation. For example, the SNAP token field 294 is generated to include a client nonce and a client certificate chain when a first DSN authentication request frame is generated and sent to a server.

In an example of operation, a first device determines to initiate an authorization sequence with a second device of a DSN. A determination may be based on one or more of a bootup sequence, a new DSN element activation indicator, a request, a communications error message, a schedule, an error indicator, a performance indicator, a reliability indicator, a predetermination, a message, and a command. For example, the first device determines to initiate the authorization sequence when the second device is newly activated and is required to authenticate with the first device. Next, the first device generates the SNAP token field 294. The generation may be based on one or more of a SNAP protocol table lookup, a mechanism of a previous authorization sequence, a status of a previous authorization sequence, a signature requirement, an authentication requirement, a message, a previous request, and a command. For example, the first device generates the SNAP token field 294 by retrieving the token from the SNAP protocol table. As another example, the first device generates the SNAP token field 294 to include a client nonce and a client certificate chain. The first device determines the handshake ID field 292 based on one or more of the SNAP token field 294, a SNAP protocol table lookup a currently active handshake ID, a currently inactive handshake ID, a random number generator function output, a device ID, a unit ID, a message, and a command. For example, the processing module determines the handshake ID field 292 that corresponds to the authenticating code of SNAP token field 294 based on a SNAP protocol table lookup. As another example, the processing module determines the handshake ID field 292 to be null when the DSN authentication request frame 288 is a first frame of an authentication sequence. For instance, the DSN authentication request frame 288 includes a SNAP token field 294 that includes a mechanism name, a client token (e.g., a user identifier and a password), and a client nonce for the first frame of the authentication sequence (e.g., no specific handshake ID field 292).

In the example continued, the first device forms the DSN authentication request frame 288 by generating the protocol header and forming the payload based on the SNAP token field 294 and the handshake ID field 292. The first device sends the DSN authentication request frame 288 to the second device. The second device receives the DSN authentication request frame 288. The second device processes the SNAP token field 294 in accordance with the handshake ID field 292 to produce a SNAP token response to generate a DSN authentication response frame. For example, the second device generates its SNAP token field to include a server nonce, a server signature, and a server certificate chain. The second device transmits the DSN authentication response frame to the first device. The first device receives the DSN authentication response frame and compares the SNAP token response to an anticipated SNAP token response. For example, the first device verifies the server signature and generates a second SNAP token to include a signature. Next, the first device sends a second DSN authentication request frame that includes the second SNAP token to the second device. The second device verifies the signature and response with another DSN authentication response frame that includes an empty SNAP token. The first device receives the other DSN authentication response frame and determines that the second device is authenticated based on the empty SNAP token. The first device indicates that the second device is authenticated when the final responses favorable. The format of the DSN authentication response frame is discussed in greater detail with reference to FIG. 16A. The method to generate the DSN authentication response frame is discussed in greater detail with reference to FIG. 16B.

FIG. 15B is a flowchart illustrating an example of authenticating a device of a dispersed storage network (DSN). The method begins at step 296 where a processing module generates a DSN authentication request frame, in accordance with a storage network authentication protocol (SNAP) request message format, that includes authenticating data and may include an authenticating code, wherein the authenticating code references a valid authenticating process. The method continues at step 298 where the processing module transmits the DSN authentication request frame to the device. The method continues at step 300 where the processing module receives a DSN authentication response frame that includes processed authenticating data, wherein the device processed the authenticating data in accordance with the valid authentication process to produce the processed authenticating data. Alternatively, the method continues at step 308 when the processing module receives a DSN response message indicating that the device does not include a valid authentication process. For example, the DSN response message includes a list of supported mechanisms, a server certificate chain, and a signature of the mechanism list and of a client nonce.

The method continues at step 302 where the processing module compares the processed authenticating data with anticipated processed authenticating data. Anticipated processed authenticating data may be based on one or more of the authenticating code, the authenticating data, the valid authenticating process, and processing the authenticating data utilizing the valid authenticating process to produce the anticipated processed authenticating data. The method branches to step 306 when the processing module determines that the processed authenticating data does not compare favorably with the anticipated processed authenticating data. The method continues to step 304 when the processing module determines that the processed authenticating data compares favorably with the anticipated processed authenticating data.

The method continues at step 304 where the processing module indicates authentication of the device. The indication includes at least one of sending a message that includes an indication of authentication of the device and setting an authorization indicator to indicate authentication of the device. Alternatively, at step 304, the processing module determines whether a mechanism sequence has been completed. The processing module indicates authentication of the device when the mechanism sequence has been completed. The processing module continues authentication of the device when the mechanism sequence has not been completed. For example, the processing module generates an alternative DSN authentication request frame that includes an alternative SNAP token (e.g., including a digital signature) and transmits the alternative DSN authentication request frame to the device. Such a mechanism sequence may include any number of cycles of requests and responses. The method continues at step 306 where the processing module indicates failure of authentication of the device. Such indication includes at least one of sending a message that includes an indication of failure of authentication of the device and setting the authorization indicator to indicate failure of authentication of the device.

The method continues at step 308 where the processing module receives the DSN response message indicating that the device does not include a valid authentication process. The processing module may validate the list of supported mechanisms of the DSN response message by verifying the signature of the mechanism list and the client nonce. Note that such a step provides a security improvement for the system by preventing an attacker from forcing a client to authenticate with a weaker or flawed authentication mechanism by sending a fraudulent message that a server does not support the mechanism that a client initially attempted to use. The nonce verification provides a security improvement for the system by preventing replay attacks of such a message.

The method continues at step 310 where the processing module selects a second valid authentication process in response to the DSN response message. Such selecting includes performing a lookup; selecting the second valid authentication process from a validated list of supported authentication mechanisms, wherein the list of supported authentication mechanisms is included in the DSN response message (e.g., validated by validating a signature over the list of supported authentication mechanisms); transmitting a request message to a DSN manager requesting the second valid authentication process and receiving a response message that includes at least one of the second valid authentication process and the second authenticating code; and generating a second DSN authentication request frame that includes the authenticating data and a second authenticating code, wherein the second authenticating code references the second valid authenticating process. At step 310, the processing module transmits the second DSN authentication request frame to the device.

Figure 16B:
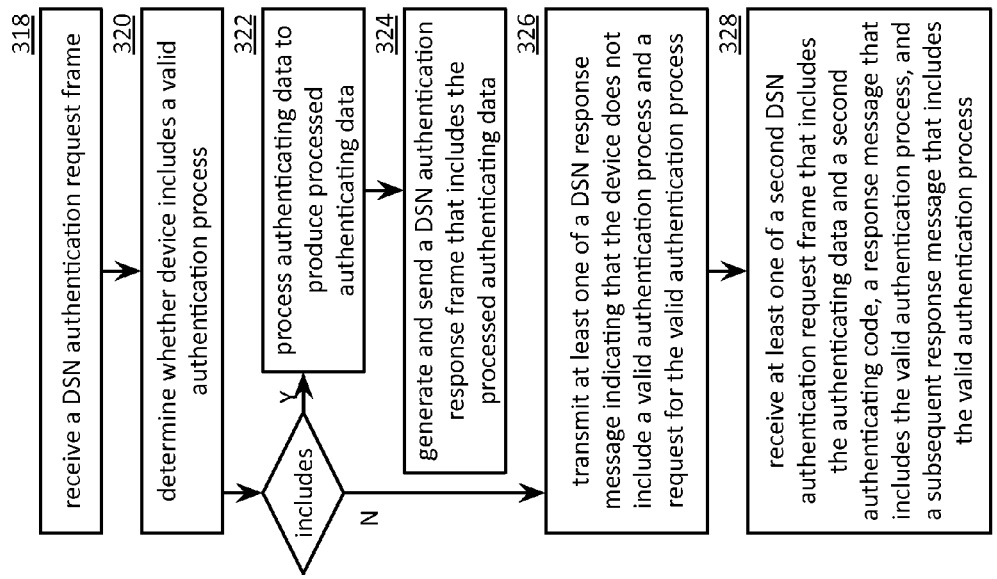
FIG. 16B is a flowchart illustrating another example of authenticating a device of a dispersed storage network (DSN) in accordance with the invention.
Figure 16A:
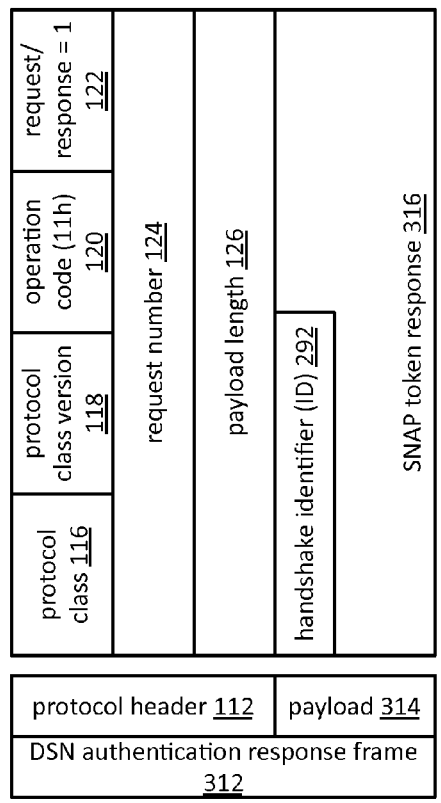
FIG. 16A is a diagram illustrating an example of a storage network authentication protocol (SNAP) response message format in accordance with the invention.

FIG. 16A is a diagram illustrating an example of a storage network authentication protocol (SNAP) response message format of a dispersed storage network (DSN) authentication response frame. A DSN authentication response frame 312 includes a protocol header 112 and a payload 314. A protocol header 112 includes one or more of a protocol class field 116, a protocol class version field 118, an operation code field 120, a request/response field 122, a request number field 124, and a payload length field 126. For example, the operation code field 120 includes an operation code value of 11 hex, the request/response field 122 includes a value of 1 (e.g., to signify a response), and the payload length field 126 includes a value representing the number of bytes of the payload 314. The method to generate and utilize the DSN authentication response frame 312 is described in greater detail with reference to FIG. 16B.

A payload 314 includes a handshake identifier (ID) field 292 and a SNAP token response field 316. A SNAP token response field 316 includes at least one of processed authenticating data and an authorization status. Processed authenticating data includes at least one of a field type indicator and one or more results of processing the authenticating data of a corresponding DSN authentication request frame in accordance with authentication mechanisms referenced by the DSN authentication request from.

In an example of operation a second device receives the DSN authentication request frame and processes authenticating data of the DSN authentication request frame in accordance with a valid authenticating process referenced by an authentication code of the DSN authentication request frame to produce the DSN authentication response frame. The second device transmits the DSN authentication response frame to a first device. Alternatively, the second device transmits a DSN response message indicating that the device does not include the valid authentication process and receives a second DSN authentication request frame that includes the authenticating data and a second authenticating code when the second device does not include the valid authentication process. Alternatively, the second device transmits a request for the valid authentication process and receives a subsequent response message that includes the valid authentication process when the second device does not include the valid authentication process.

FIG. 16B is a flowchart illustrating another example of authenticating a device of a dispersed storage network (DSN). The method begins with step 318 where a processing module receives a DSN authentication request frame that includes authenticating data and an authenticating code, wherein the authenticating code references a valid authenticating process. The method continues at step 320 where the processing module determines whether the device includes the valid authentication process referenced by the authentication code. A determination may be based on one or more of a memory scan, a table lookup, the query, and a message. The method branches to step 326 when the processing module determines that the device does not include the valid authentication process. The method continues to step 322 when the processing module determines that the device includes the valid authentication process.

The method continues at step 322 where the processing module processes the authenticating data in accordance with the valid authentication process to produce processed authenticating data. For example, the processing module performs a hashing function on the authenticating data to produce the processed authenticating data, wherein the hashing function is referenced by the authentication code. The method continues at step 324 where the processing module generates a DSN authentication response frame that includes the processed authenticating data in accordance with a storage network authentication protocol response message format. At step 324, the processing module transmits the DSN authentication response frame (e.g., to a requesting entity associated with the DSN authentication request frame).

The method continues at step 326 where the processing module transmits at least one of a DSN response message indicating that the device does not include the valid authentication process and a request for the valid authentication process (e.g., to a DSN manager) when the device does not include the valid authentication process. The method continues at step 328 where the processing module receives at least one of a second DSN authentication request frame that includes the authenticating data and a second authenticating code, a response message that includes the valid authentication process, and a subsequent response message that includes the valid authentication process, wherein the second authenticating code references a second valid authenticating process. The processing module may save the second valid authentication process and associated second authenticating code to facilitate subsequent utilization of the second valid authentication process one the second authenticating code is received in another DSN authentication request from.

Figure 17B:
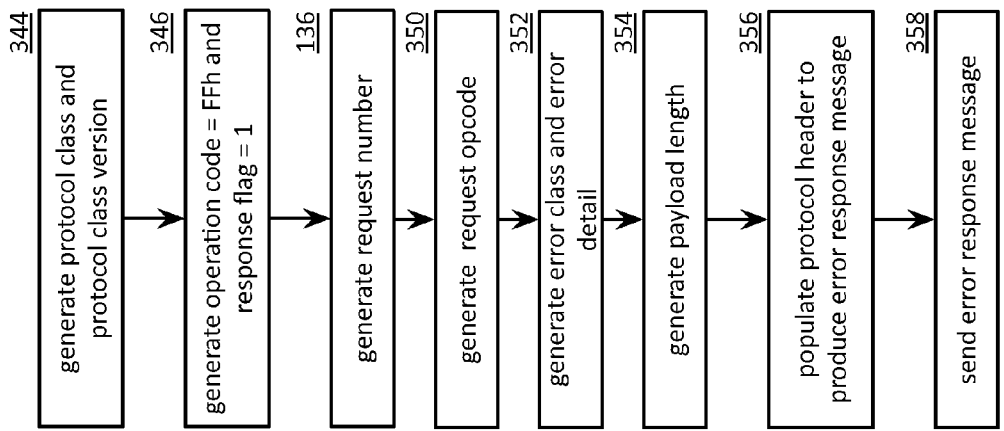
FIG. 17B is a flowchart illustrating an example of generating an error response message in accordance with the invention.
Figure 17A:
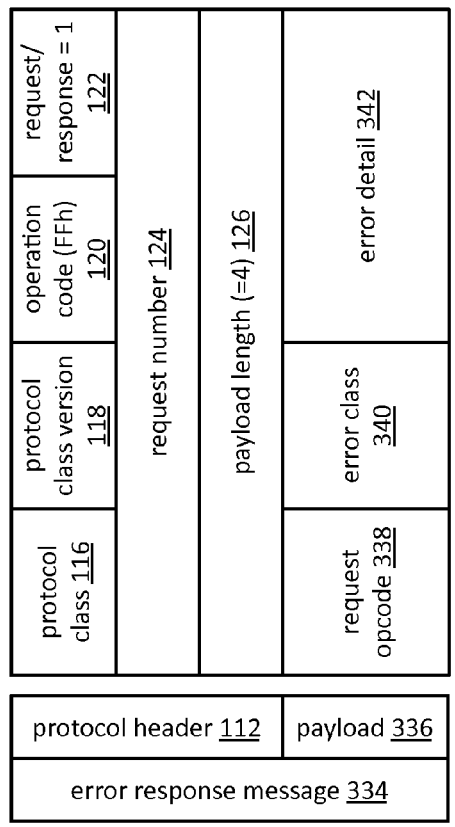
FIG. 17A is a diagram illustrating an example of an error response message format in accordance with the invention.

FIG. 17A is a diagram illustrating an example of an error response message format of an error response message 334. An error response message 334 includes a protocol header 112 and a payload 336. A protocol header 112 includes one or more of a protocol class field 116, a protocol class version field 118, an operation code field 120, a request/response field 122, a request number field 124, and a payload length field 126. For example, the operation code field 120 includes an operation code value of FF hex, the request/response field 122 includes a value of 1 (e.g., to signify a response), and the payload length field 126 includes a value representing the number of bytes of the payload 336. The method to generate and utilize the error response message 334 is described in greater detail with reference to FIG. 17B.

A payload 336 includes a request opcode field 338, an error class field 340, and an error detail field 342. A request opcode field 338 indicates an opcode of a previously received request message associated with an error condition. An error class field 340 includes an error class indicating a first level descriptor of the error condition. An error detail field 342 includes an error detail indicating a second level descriptor associated with the error class and the error condition. For example, the opcode field 338 indicates opcode 10 hex when an opcode associated with a previously received request message associated with the error condition was a start transport layer security (TLS) request message. As another example, the error class field 340 indicates 30 hex when the request message is not allowed. As yet another example, the error detail field 342 indicates 3294 hex when a requesting element of a dispersed storage network (DSN) is unauthorized to initiate a start TLS sequence. In an instance of implementation, the request opcode field 338 is one byte in length, the error class field 340 is one byte in length, and the error detail field 342 is two bytes in length.

In an example of operation, a storage network authentication protocol (SNAP) request message is received from a requesting element. The received SNAP request message is processed to produce a mechanism rejecting the authentication request when the request is unauthorized. A request opcode of the error response message is generated as an opcode of the SNAP request message. The error class and error detail are generated in accordance with the mechanism rejecting the authentication request (e.g., indicating that the request is unauthorized). The error response message 334 is sent to the requesting element.

FIG. 17B is a flowchart illustrating an example of generating an error response message, which include similar steps to FIG. 6D. The method begins with step 344 where a processing module generates a protocol class and a protocol class version based on one or more of a default list for new system elements, a supported protocol indicator, information received in a previous message, a list, a predetermination, a command, and a protocol table lookup when the processing module determines to generate and send the error response message (e.g., an error associated with a corresponding request message is detected). For example, the processing module may generate the protocol class and protocol class version as 01 hex when the processing module determines that there is only one supported protocol class and one supported protocol class version as indicated by a table lookup.

The method continues at step 346 where the processing module generates an operation code and a response flag based on one or more of the protocol class, the protocol class version, information received in a previous message, a list, a task identifier, a predetermination, a command, and a table lookup. For example, the processing module generates the operation code as FF hex when the processing module receives a command to execute an error response sequence. At step 346, the processing module generates the response flag as one when the processing module determines that this message is a response message based on the command. The method continues at step 136 of FIG. 6D where the processing module generates a request number (e.g., same as a request number of a corresponding request message associated with an error).

The method continues at step 350 where the processing module generates a request opcode field to include a request opcode of a corresponding request message associated with an error. The method continues at step 352 where the processing module generates an error class field based on at least one of the error and the request opcode. Next, at step 352, the processing module generates an error detail field based on one or more of the error, the request opcode, and the error class. For example, the processing module generates the error detail field to include an error detail indicating that the corresponding request message associated with the error included an unsupported version.

The method continues at step 354 where the processing module generates a payload length field based on one or more of an opcode to payload length lookup table, the opcode, a calculation, the number of bytes in the payload, a formula, a predetermination, a message, and a command. For example, the processing module generates the payload length as a sum of the number of bytes of the request opcode field, the error class field, and the error detail field. The method continues at step 356 where the processing module populates the request message protocol header and payload, to produce the error response message in accordance with an error response message format. The method continues at step 358 where the processing module sends the error response message to a requesting entity associated with the corresponding request message.

As may be used herein, the terms "substantially" and "approximately" provides an industry-accepted tolerance for its corresponding term and/or relativity between items. An industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

While the transistors in the above described figure(s) is/are shown as field effect transistors (FETs), as one of ordinary skill in the art will appreciate, the transistors may be implemented using any type of transistor structure including, but not limited to, bipolar, metal oxide semiconductor field effect transistors (MOSFET), N-well transistors, P-well transistors, enhancement mode, depletion mode, and zero voltage threshold (VT) transistors.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any Alternate boundaries or sequences are thus within the scope and spirit of the claimed invention.

The present invention has been described, at least in part, in terms of one or more embodiments. An embodiment of the present invention is used herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc. described with reference to one or more of the embodiments discussed herein.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

What is claimed is:

1. A method comprises:
    detecting a dispersed storage network (DSN) protocol issue that potentially adversely affects an ability to access dispersed storage error encoded data within a DSN;
    identifying a DSN entity having the DSN protocol issue;
    generating a DSN protocol inquiry frame;

transmitting the DSN protocol inquiry frame to the DSN entity;
receiving a DSN protocol response frame from the DSN entity; and
resolving, within the DSN entity, the DSN protocol issue based on the DSN protocol response frame to reduce the potential for adversely affecting access of the dispersed storage error encoded data;
wherein the resolving the DSN protocol issue comprises:
  comparing a protocol information received via the DSN protocol response frame with a known protocol information to identify a common protocol and common protocol version;
  generating a protocol selection frame that identifies the common protocol and the common protocol version; and
  transmitting the protocol selection frame to the DSN entity.

2. The method of claim 1, wherein the detecting the potential DSN protocol issue comprises one or more of:
detecting a new DSN entity of the DSN;
detecting a boot up sequence;
receiving a communication failure message; and
receiving an error message.

3. The method of claim 1, wherein the detecting the potential DSN protocol issue comprises:
detecting a decode threshold failure regarding a read function of the dispersed storage error encoded data;
identifying a set of dispersed storage (DS) units of the DSN, wherein a DS unit of the sets of DS units stores an encoded data slice of the dispersed storage error encoded data and wherein the DSN entity is one of the set of DS units;
generating a set of DSN protocol inquiry frames that include the DSN protocol inquiry frame;
transmitting the set of DSN protocol inquiry frames to the set of DS units;
receiving DSN protocol response frames from at least some of the set of DS units; and
resolving the DSN protocol issue based on the DSN protocol response frames.

4. The method of claim 1, wherein the detecting the potential DSN protocol issue comprises:
detecting a system level operation for a general protocol inquiry of the DSN entity.

5. The method of claim 1, wherein the DSN entity comprises one of:
a dispersed storage (DS) unit;
a DS processing module;
a DS managing module;
a DS rebuilding module; and
a user device.

6. The method of claim 1, wherein the generating the DSN protocol inquiry frame comprises at least one of:
generating an operation code field to indicate the protocol discovery request operation;
generating a request number field to include a request number associated with the protocol discovery request operation;
generating a protocol class field to indicate a protocol class for the protocol discovery request operation;
generating a protocol class version field for the protocol discovery request operation;
generating a payload length field of the protocol header to include a predetermined payload length value; and
generating a request/response field to indicate a request message.

7. A method comprises:
receiving a dispersed storage network (DSN) protocol inquiry frame regarding a DSN protocol issue that potentially adversely affects an ability to access dispersed storage error encoded data within a DSN;
generating a DSN protocol response frame that includes protocol information;
transmitting the DSN protocol response frame to a requesting DSN entity; and
receiving a DSN protocol resolution frame from the requesting DSN entity, wherein the DSN protocol resolution frame includes information regarding resolving the DSN protocol issue to reduce the potential for adversely affecting access of the dispersed storage error encoded data;
wherein the DSN protocol resolution frame is a protocol selection frame that indicates a common protocol and common protocol version between protocol information included in the DSN protocol response frame and a known protocol.

8. The method of claim 7, wherein the generating the DSN protocol response frame comprises:
generating a payload to include one or more protocol fields and one or more corresponding version fields, wherein a protocol field of the one or more protocol fields indicates a supported protocol and a corresponding version field of the one or more corresponding version fields indicates a version of the supported protocol; and
generating a header by at least one of:
  generating a payload length field of the protocol header to include a payload length that represents a length of the one or more protocol fields and the one or more corresponding version fields;
  generating a request number field to include a request number associated with a protocol discovery request operation;
  generating a protocol class field to indicate a protocol class for the protocol discovery response operation;
  generating a protocol class version field for the protocol discovery response operation;
  generating an operation code field to indicate the protocol discovery response operation; and
  generating a request/response field to indicate a response message.

9. The method of claim 7 further comprises:
interpreting the DSN protocol resolution frame to identify a common protocol and a common protocol version; and
for access requests regarding the dispersed storage error encoded data, utilizing the common protocol in accordance with the common protocol version.

10. A computer comprises:
an interface;
a memory; and
a processing module operable to:
  detect a dispersed storage network (DSN) protocol issue that potentially adversely affects an ability to access dispersed storage error encoded data within a DSN;
  identify a DSN entity having the DSN protocol issue;
  generate a DSN protocol inquiry frame;
  transmit, via the interface, the DSN protocol inquiry frame to the DSN entity;
  receive, via the interface, a DSN protocol response frame from the DSN entity; and
  resolve, for the DSN entity, the DSN protocol issue based on the DSN protocol response frame to reduce the potential for adversely affecting access of the dispersed storage error encoded data;

wherein the processing module functions to resolve the DSN protocol issue by:
comparing a protocol information received via the DSN protocol response frame with a known protocol information to identify a common protocol and common protocol version;
generating a protocol selection frame that identifies the common protocol and the common protocol version; and
transmitting, via the interface, the protocol selection frame to the DSN entity.

11. The computer of claim 10, wherein the processing module functions to detect the potential DSN protocol issue by one or more of:
detecting a new DSN entity of the DSN;
detecting a boot up sequence;
receiving, via the interface, a communication failure message; and
receiving, via interface, an error message.

12. The computer of claim 10, wherein the processing module functions to detect the potential DSN protocol issue by:
detecting a decode threshold failure regarding a read function of the dispersed storage error encoded data;
identifying a set of dispersed storage (DS) units of the DSN, wherein a DS unit of the sets of DS units stores an encoded data slice of the dispersed storage error encoded data and wherein the DSN entity is one of the set of DS units;
generating a set of DSN protocol inquiry frames that include the DSN protocol inquiry frame;
transmitting, via the interface, the set of DSN protocol inquiry frames to the set of DS units;
receiving, via the interface, DSN protocol response frames from at least some of the set of DS units; and
resolving the DSN protocol issue based on the DSN protocol response frames.

13. The computer of claim 10, wherein the processing module functions to detect the potential DSN protocol issue by:
detecting a system level operation for a general protocol inquiry of the DSN entity.

14. The computer of claim 10, wherein the DSN entity comprises one of:
a dispersed storage (DS) unit;
a DS processing module;
a DS managing module;
a DS rebuilding module; and
a user device.

15. The computer of claim 10, wherein the processing module functions to generate the DSN protocol inquiry frame by at least one of:
generating an operation code field to indicate the protocol discovery request operation;
generating a request number field to include a request number associated with the protocol discovery request operation;
generating a protocol class field to indicate a protocol class for the protocol discovery request operation;
generating a protocol class version field for the protocol discovery request operation;
generating a payload length field of the protocol header to include a predetermined payload length value; and
generating a request/response field to indicate a request message.

16. A computer comprises:
an interface;
a memory; and
a processing module operable to:
receive, via the interface, a dispersed storage network (DSN) protocol inquiry frame regarding a DSN protocol issue that potentially adversely affects an ability to access dispersed storage error encoded data within a DSN;
generate a DSN protocol response frame that includes protocol information;
transmit, via the interface, the DSN protocol response frame to a requesting DSN entity; and
receive, via the interface, a DSN protocol resolution frame from the requesting DSN entity, wherein the DSN protocol resolution frame includes information regarding resolving the DSN protocol issue to reduce the potential for adversely affecting access of the dispersed storage error encoded data;
wherein the DSN protocol resolution frame is a protocol selection frame that indicates a common protocol and common protocol version between protocol information included in the DSN protocol response frame and a known protocol.

17. The computer of claim 16, wherein the processing module functions to generate the DSN protocol response frame by:
generating a payload to include one or more protocol fields and one or more corresponding version fields, wherein a protocol field of the one or more protocol fields indicates a supported protocol and a corresponding version field of the one or more corresponding version fields indicates a version of the supported protocol; and
generating a header by at least one of:
generating a payload length field of the protocol header to include a payload length that represents a length of the one or more protocol fields and the one or more corresponding version fields;
generating a request number field to include a request number associated with a protocol discovery request operation;
generating a protocol class field to indicate a protocol class for the protocol discovery response operation;
generating a protocol class version field for the protocol discovery response operation;
generating an operation code field to indicate the protocol discovery response operation; and
generating a request/response field to indicate a response message.

18. The computer of claim 16, wherein the processing module further functions to:
interpret the DSN protocol resolution frame to identify a common protocol and a common protocol version; and
for access requests regarding the dispersed storage error encoded data, utilize the common protocol in accordance with the common protocol version.

* * * * *

UNITED STATES PATENT AND TRADEMARK OFFICE
CERTIFICATE OF CORRECTION

| | | |
|---|---|---|
| PATENT NO. | : 8,938,552 B2 | Page 1 of 1 |
| APPLICATION NO. | : 13/180669 | |
| DATED | : January 20, 2015 | |
| INVENTOR(S) | : Baptist et al. | |

It is certified that error appears in the above-identified patent and that said Letters Patent is hereby corrected as shown below:

On the Title page, item (*): Insert --This patent is subject to a terminal disclaimer.--
On the Title page, item (63) Related U.S. Application Data: Replace "Continuation" with --Continuation-in-part--

Signed and Sealed this
Third Day of November, 2015

Michelle K. Lee
*Director of the United States Patent and Trademark Office*